United States Patent [19]

Fujioka

[11] Patent Number: 5,740,042
[45] Date of Patent: Apr. 14, 1998

[54] ANTISKID CONTROL DEVICE WITH A DRIVE MADE JUDGING MEANS FOR A PART-TIME 4-WHEEL DRIVE VEHICLE

[75] Inventor: Hideaki Fujioka, Itami, Japan

[73] Assignee: Sumitomo Electric Industries, Ltd., Osaka, Japan

[21] Appl. No.: 423,636

[22] Filed: Apr. 17, 1995

[30] Foreign Application Priority Data

May 18, 1994 [JP] Japan .................. 6-104129

[51] Int. Cl.[6] .................. B60T 8/00; B60K 17/34
[52] U.S. Cl. .................. 364/426.015; 364/426.01; 364/426.035; 364/424.098; 303/190; 180/197
[58] Field of Search .................. 364/426.02, 426.01, 364/426.03, 426.04, 426.035, 426.024, 426.027, 426.015, 424.098; 180/197, 233, 244, 247, 248; 303/170, 173, 186, 144, 190, 176

[56] References Cited

U.S. PATENT DOCUMENTS

| | | | |
|---|---|---|---|
| 4,715,466 | 12/1987 | Ishii et al. | 180/233 |
| 4,762,376 | 8/1988 | Matsubara | 303/115.4 |
| 5,005,663 | 4/1991 | Niide et al. | 180/247 |
| 5,019,985 | 5/1991 | Yasuno et al. | 364/426.024 |
| 5,184,695 | 2/1993 | Matsuda et al. | 180/244 |
| 5,228,758 | 7/1993 | Fujioka et al. | 303/111 |
| 5,249,849 | 10/1993 | Sakata | 364/426.02 |
| 5,411,110 | 5/1995 | Wilson et al. | 180/247 |
| 5,485,894 | 1/1996 | Watson et al. | 180/197 |

FOREIGN PATENT DOCUMENTS 1311939  12/1989  Japan .

Primary Examiner—Tan Q. Nguyen
Attorney, Agent, or Firm—Greenblum & Bernstein, P.L.C.

[57] ABSTRACT

An antiskid control device for use in a motor vehicle which can be changed over to 2WD and 4WD by a changeover member, comprising: a drive signal output member for outputting a drive signal indicating that the changeover member is set to one of 2WD and 4WD such that changeover between antiskid control for 2WD and antiskid control for 4WD is performed in accordance with the drive signal; and a drive mode judging member which detects from behaviors of wheels of the motor vehicle that an actual drive mode of the motor vehicle is 2WD when the drive signal indicates that the changeover member is set to 4WD; wherein when the drive mode judging member has detected that the actual drive mode of the motor vehicle is 2WD, antiskid control for 4WD is changed over to antiskid control for 2WD.

18 Claims, 16 Drawing Sheets

ANTISKID CONTROL DEVICE WITH A DRIVE MADE JUDGING MEANS FOR A PART-TIME 4-WHEEL DRIVE VEHICLE

BACKGROUND OF THE INVENTION

The present invention generally relates to antiskid control devices and more particularly, to an antiskid control device for use in a motor vehicle of so-called "part-time four-wheel drive", i.e., a motor vehicle capable of being changed over to two-wheel drive (2WD) and four-wheel drive (4WD), in which changeover between antiskid control for 2WD and antiskid control for 4WD can be performed in accordance with drive modes set by a changeover means such as a switch.

Conventionally, an antiskid control device for part-time 4WD has been proposed in which changeover between 2WD and 4WD is performed by a changeover means such as a switch. In the known antiskid control device of this kind, by detecting whether the changeover means is set to 2WD or 4WD, antiskid control is changed over to that for 2WD or that for 4WD in accordance with this detection.

In antiskid control for 2WD, for example, four wheels are controlled independently of one other. Alternatively, front left and right wheels are controlled independently of each other, while rear left and right wheels are controlled based on one of the rear left and right wheels having more manifest locking symptom than the other of the rear left and right wheels.

On the other hand, in antiskid control for 4WD, for example, front wheels are controlled independently of each other. Meanwhile, when a decision of pressure reduction for the front wheels is made even if it is judged from behaviors of rear wheels that pressure reduction for the rear wheels is not necessary, the rear wheels are controlled by performing pressure reduction for the rear wheels.

However, in the known antiskid control device, such a phenomenon may happen in which due to failures of the changeover means, actual drive mode of the motor vehicle is 2WD even if the changeover means is set to 4WD. In this case, if antiskid control is performed in accordance with setting of the changeover means, antiskid control for 4WD is performed for the motor vehicle under 2WD, thereby resulting in such an inconvenience as shown in FIG. 19. In FIG. 19, VREF denotes an estimated vehicle body speed, SPEEDf and Pf denote a wheel speed and a brake fluid pressure of one of front left and right wheels, respectively and SPEEDr and Pr denote a wheel speed and a brake fluid pressure of one of rear left and right wheels, respectively.

In FIG. 19, solid lines indicate a case in which antiskid control for 2WD is performed for the motor vehicle under 2WD. At a time point t1, locking symptom of the front wheel is detected and the brake fluid pressure Pf of the front wheel is reduced. Meanwhile, locking symptom of the rear wheel is not detected until a time point t2 and thus, the brake fluid pressure Pr of the rear wheel is increased until the time point t2.

On the other hand, if antiskid control for 4WD is performed for the motor vehicle under 2WD, the brake fluid pressure Pr of the rear wheel is also reduced as shown by the one-dot chain line and thus, loss of braking force is incurred by an amount corresponding to a hatched portion a. Therefore, in case antiskid control for 4WD is performed for the motor vehicle under 2WD, such a problem arises that especially in the case of a road surface having low coefficient μ of friction, for example, a snow-covered road surface and a frozen road surface, braking distance increases greatly.

Meanwhile, such a case may also happen in which due to failures of the changeover means, actual drive mode of the motor vehicle is 4WD even if the changeover means is set to 2WD. A problem posed in this case is not so serious as that of FIG. 19 in which antiskid control for 4WD is performed for the motor vehicle under 2WD. In FIG. 20, solid lines indicate a case in which antiskid control for 4WD is performed for the motor vehicle under 4WD. $SPEED_0$ and $SPEED_1$ denote wheel speeds of the front wheels, $P_0$ and $P_1$ denote brake fluid pressures of the front wheels, $SPEED_2$ and $SPEED_3$ denote wheel speeds of the rear wheels and $P_2$ and $P_3$ denote brake fluid pressures of the rear wheels.

When locking symptom is detected in the wheel speed $SPEED_0$ of one front wheel at a time point t1, the brake fluid pressure $P_0$ is reduced. Furthermore, at the time point t1, the brake fluid pressures $P_2$ and $P_3$ of the rear wheels in which locking symptom has not yet been detected are also reduced. In 4WD mode, relation of $(SPEED_0+SPEED_1=SPEED_2+SPEED_3)$ is substantially satisfied even under influences of torsion of a drive shaft. Therefore, if $(SPEED_2=SPEED_3)$ is supposed, each of the wheel speeds $SPEED_2$ and $SPEED_3$ is equal to $\{0.5\times(SPEED_0+SPEED_1)\}$ and thus, the wheel speeds $SPEED_2$ and $SPEED_3$ of the rear wheels follow the wheel speeds $SPEED_0$ and $SPEED_1$ of the front wheels.

On the other hand, if antiskid control for 2WD is performed for the motor vehicle under 4WD, the brake fluid pressures $P_2$ and $P_3$ of the rear wheels are reduced as shown by the one-dot chain line at a time point t2 when locking symptom has been detected in the wheel speeds $SPEED_2$ and $SPEED_3$ of the rear wheels. Hence, such loss of braking force as in a case in which antiskid control for 4WD is performed for the motor vehicle under 2WD is not incurred and thus, increase of braking distance does not take place.

SUMMARY OF THE INVENTION

Accordingly, an essential object of the present invention is to provide, with a view to eliminating the above mentioned drawbacks of prior art antiskid control device for a motor vehicle of part-time 4WD, an antiskid control device for a motor vehicle of part-time 4WD, which is capable of, even if a changeover means for effecting changeover between 2WD and 4WD fails, performing antiskid control for 2WD positively when the motor vehicle is under 2WD.

In order to accomplish this object of the present invention, an antiskid control device for use in a motor vehicle which can be changed over to 2WD and 4WD by a changeover means, according to one embodiment of the present invention comprises: a drive signal output means for outputting a drive signal indicating that the changeover means is set to one of 2WD and 4WD such that changeover between antiskid control for 2WD and antiskid control for 4WD is performed in accordance with the drive signal; and a drive mode judging means which detects from behaviors of wheels of the motor vehicle that an actual drive mode of the motor vehicle is 2WD when the drive signal indicates that the changeover means is set to 4WD; wherein when the drive mode judging means has detected that the actual drive mode of the motor vehicle is 2WD, antiskid control for 4WD is changed over to antiskid control for 2WD.

The antiskid control device is an antiskid control device for use in a motor vehicle which can be changed over to 2WD and 4WD by the changeover means and includes the drive mode judging means which detects from behaviors of the wheels that the actual drive mode of the motor vehicle is 2WD when the changeover means is set to 4WD. Therefore, in case the drive mode of the motor vehicle is 2WD, antiskid control for 2WD is performed positively.

In an antiskid control device according to the present invention, a longitudinal speed difference equal to a difference between an average front wheel speed and an average rear wheel speed is smoothed into a smoothed longitudinal speed difference by a smoothed longitudinal speed difference calculating means such that when this smoothed longitudinal speed difference falls out of a range between a predetermined upper threshold value and a predetermined lower threshold value, it is judged that the drive mode of the motor vehicle is 2WD. Therefore, also when wheel speeds oscillate, it is possible to positively detect that the actual drive mode of the motor vehicle is 2WD when the changeover means is set to 4WD.

Further, an antiskid control device according to the prevent invention includes a first arithmetic means for calculating and outputting an arithmetic value subjected to addition and subtraction when the longitudinal speed difference is positive and negative, respectively such that when this arithmetic value falls out of a range between a predetermined upper threshold value and a predetermined lower threshold value, it is judged that the drive mode of the motor vehicle is 2WD. Thus, also in case the wheel speeds oscillate, it is possible to positively detect that the actual drive mode of the motor vehicle is 2WD when the changeover means is set to 4WD.

A first arithmetic means is provided for calculating an arithmetic value subjected to addition and subtraction when the longitudinal speed difference is not less than a predetermined positive upper limit value and not more than a predetermined negative lower limit value, respectively such that this longitudinal speed difference falls out of a range between the upper threshold value and the lower threshold value, neither addition nor subtraction for the arithmetic value is performed. Since it is judged that the drive mode of the motor vehicle is 2WD if the arithmetic value falls out of a range between an upper threshold value and a lower threshold value, it is judged that the drive mode of the motor vehicle is 2WD. Therefore, it is possible to further positively detect that the drive mode of the motor vehicle is 2WD.

A first arithmetic means is further provided for calculating and outputting an arithmetic value subjected to addition and subtraction when the smoothed longitudinal speed difference is positive and negative, respectively such that when this arithmetic value falls out of a range between an upper threshold value and a lower threshold value, it is judged that the actual drive mode of the motor vehicle is 2WD. Accordingly, it is possible to further positively detect that the drive mode of the motor vehicle is 2WD.

Further yet, a first arithmetic means is provided for calculating and outputting an arithmetic value when the smoothed longitudinal speed difference is not less than a predetermined positive upper limit value and not more than a predetermined negative lower threshold value, respectively such that when this arithmetic value falls out of a range between an upper threshold value and a lower threshold value, it is judged that the actual drive mode of the motor vehicle is 2WD. Therefore, it is possible to further positively detect that the drive mode of the motor vehicle is 2WD.

A second arithmetic means is provided which inspects the arithmetic value at an interval of a predetermined number of control cycles so as to perform subtraction and addition for the arithmetic value when the arithmetic value is positive and negative, respectively. Accordingly, since neither subtraction nor addition for the arithmetic value is performed unnecessarily by temporary behaviors of the wheels, it is possible to prevent erroneous detection of 2WD.

If the drive mode judging means detects that the drive mode of the motor vehicle is 2WD, antiskid control for 2WD is performed until antiskid control is finished. Therefore, antiskid control for 2WD is not changed over to antiskid control for 4WD during antiskid control.

Absolute values of the upper and lower threshold values are set large during a predetermined period from start of braking of the motor vehicle. Thus, it is possible to detect 2WD without undergoing influences of oscillations of the wheel speeds at the time of start of braking.

In case the motor vehicle is of front wheel drive at the time of 2WD, the longitudinal speed difference is inclined to extend into a region of the lower threshold value at the time of 4WD. By setting an absolute value of the lower threshold value larger than that of the upper threshold value, it is possible to positively prevent erroneous detection of 2WD.

In case the motor vehicle is of rear wheel drive at the time of 2WD, the longitudinal speed difference is apt to extend into a region of the upper threshold value at the time of 4WD. By setting an absolute value of the upper threshold value larger than that of the lower threshold value, it is possible to positively prevent erroneous detection of 2WD.

Only when a vehicle body deceleration detected by a longitudinal acceleration sensor is not more than a preset value, 2WD is detected. Therefore, only on a road surface having low coefficient μ of friction, for which changeover between antiskid control for 2WD and antiskid control for 4WD is quite necessary, changeover between antiskid control for 2WD and antiskid control for 4WD is performed.

BRIEF DESCRIPTION OF THE DRAWINGS

This object and features of the present invention will become apparent from the following description taken in conjunction with the preferred embodiments thereof with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

Figure 1:
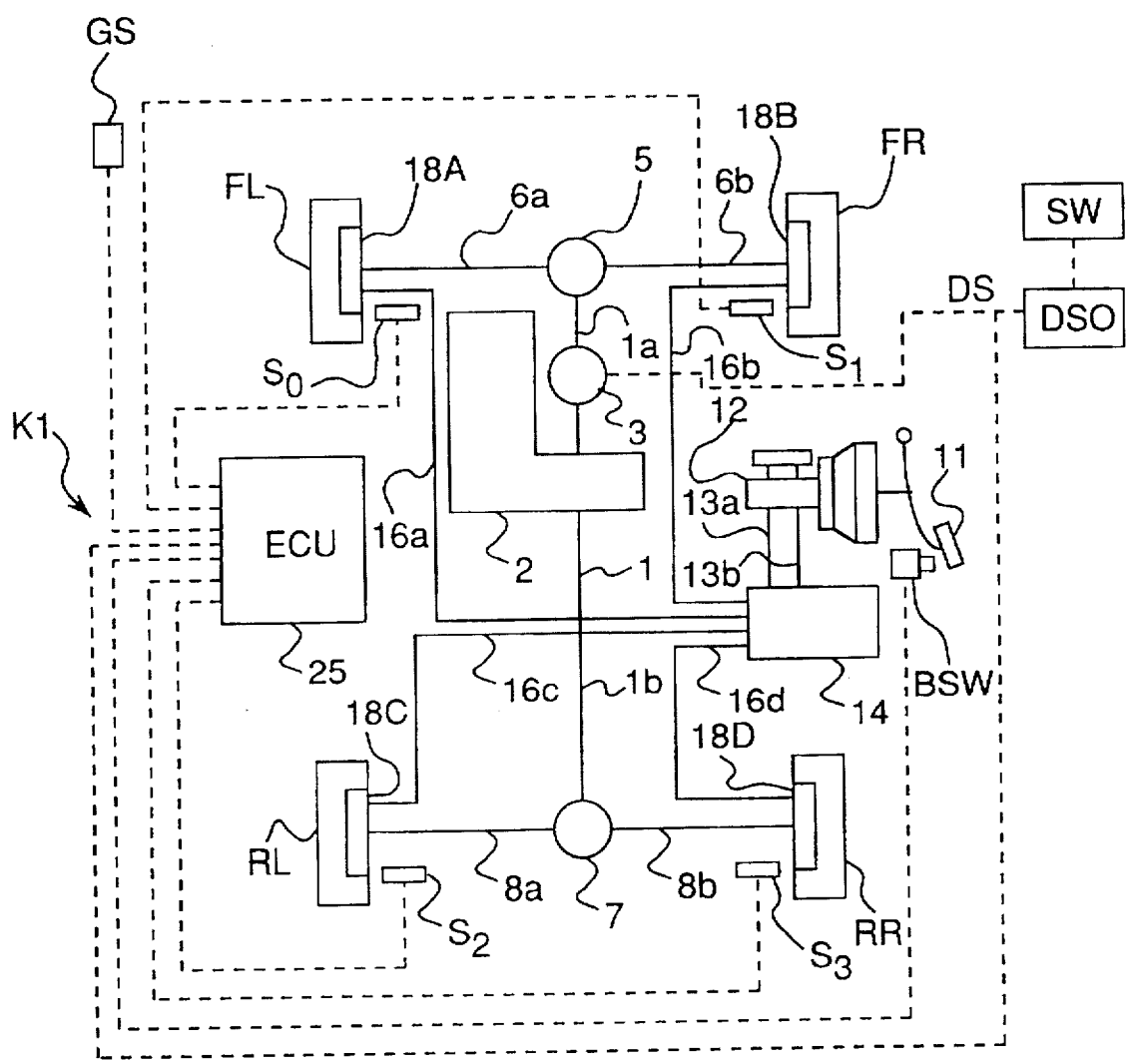
FIG. 1 is a schematic view of a motor vehicle provided with an antiskid control device according to a first embodiment of the present invention.
Figure 2:
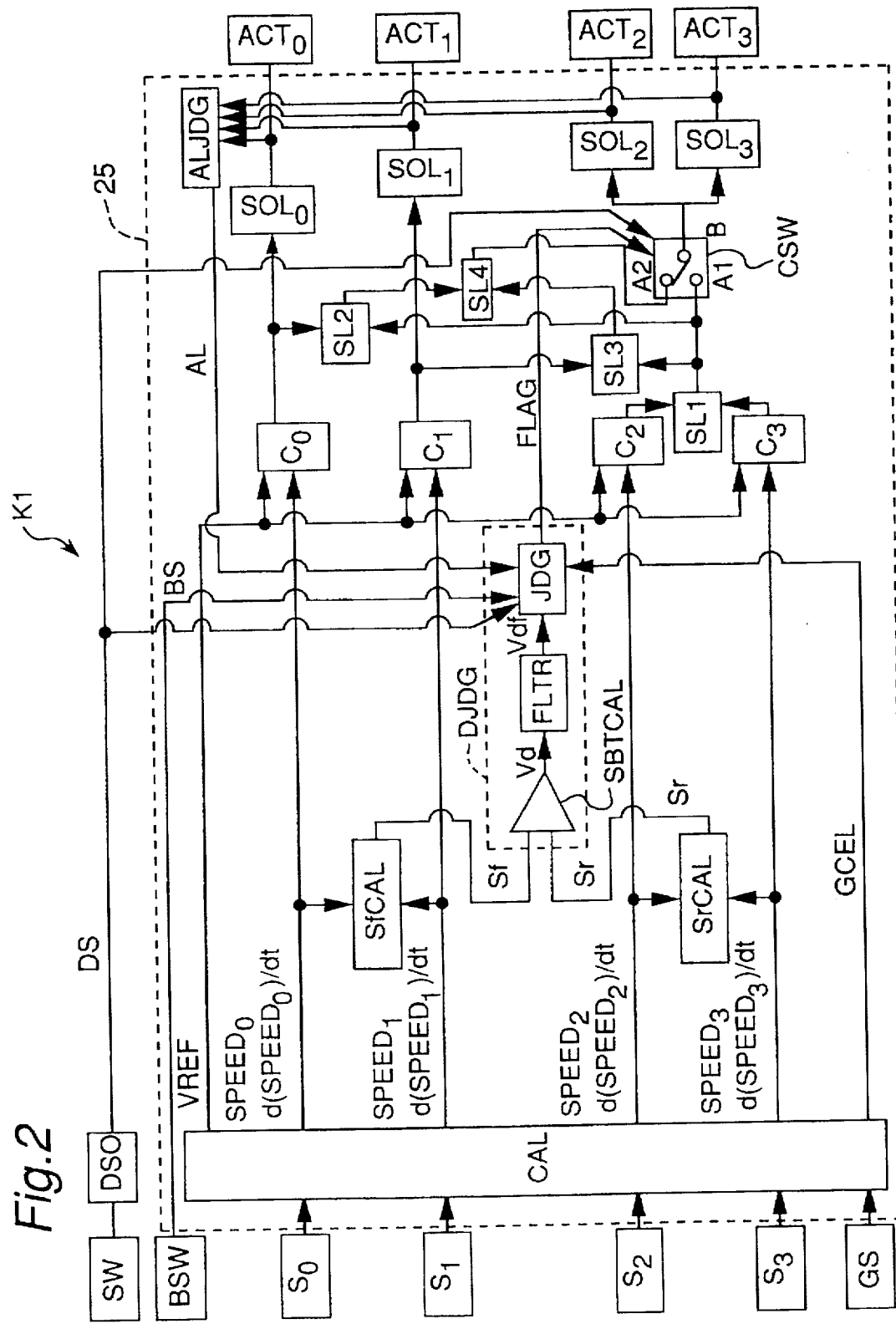
FIG. 2 is a schematic view of an electronic control unit employed in the antiskid control device of FIG. 1.

Referring now to the drawings, there is shown in FIGS. 1 and 2, a motor vehicle provided with an antiskid control device K1 according to a first embodiment of the present invention. This motor vehicle is of part-time four-wheel drive enabling changeover between two-wheel drive (2WD) and four-wheel drive (4WD). In FIG. 1, a driving shaft 1 includes a front driving shaft 1a for front wheels and a rear driving shaft 1b for rear wheels. The front and rear driving shafts 1a and 1b are coupled with and uncoupled from each other by a central control mechanism 3. A front differential mechanism 5 is coupled with the front driving shaft 1a. Meanwhile, axles 6a and 6b which are, respectively, coupled with front left and right wheels FL and FR are coupled with the front differential mechanism 5. On the other hand, a rear differential mechanism 7 is coupled with the rear driving shaft 1b. Furthermore, axles 8a and 8b which are, respectively, coupled with rear left and right wheels RL and RR are coupled with the rear differential mechanism 7.

In FIG. 1, a changeover switch SW acting as a changeover means is provided for effecting changeover between 2WD and 4WD. The changeover switch SW is operated manually so as to change over drive modes of the motor vehicle. In accordance with whether the changeover switch SW is set to 2WD or 4WD, a drive signal output means DSO outputs to the central control mechanism 3 a drive signal DS commanding uncoupling or coupling between the front and rear driving shafts 1a and 1b. Namely, when the changeover switch SW is set to 2WD, the drive signal output means DSO outputs to the central control mechanism 3 a low-level drive signal DS (2WD command) for uncoupling the front and rear driving shafts 1a and 1b from each other so as to set the motor vehicle to 2WD state. On the contrary, when the changeover switch SW is set to 4WD, the drive signal output means DSO outputs to the central control mechanism 3 a high-level drive signal DS (4WD command) for coupling the front and rear driving shaft 1a and 1b with each other so as to set the motor vehicle to 4WD state. In addition, the drive signal output means DSO outputs this drive signal DS also to an electronic control unit 25 to be described later.

Figure 3:
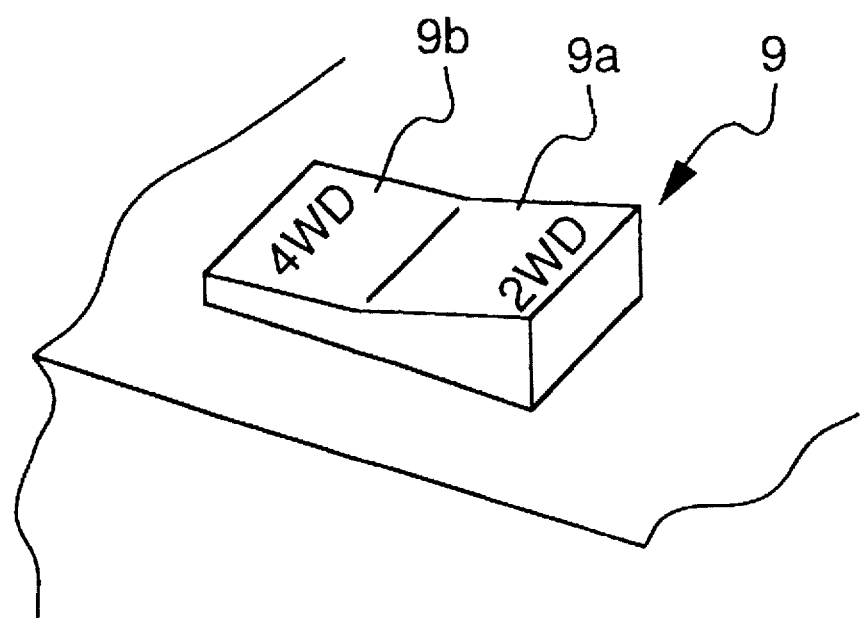
FIG. 3 is a perspective view of a changeover switch employed in the antiskid control device of FIG. 1.

In the first embodiment, a seesaw type switch 9 shown in FIG. 3 is provided as the changeover switch SW in the vicinity of a driver's seat. When a driver depresses one portion 9a of the seesaw type switch 9, the drive signal output means DSO outputs the low-level drive signal DS (2WD command). Meanwhile, when the driver depresses the other portion 9b of the seesaw type switch 9, the drive signal output means DSO outputs the high-level drive signal DS (4WD command). However, the changeover switch SW is not restricted to this seesaw type switch 9 but may also be formed by one of various manual switches such as a push switch, a slide switch, etc.

A master cylinder 12 actuated by a brake pedal 11 and a fluid pressure adjusting means 14 are connected with each other by conduits 13a and 13b. One conduit 13a is connected, through the fluid pressure adjusting means 14, with a conduit 16a leading to a wheel brake 18A of the front left wheel FL and a conduit 16d leading to a wheel brake 18D of the rear right wheel RR. Meanwhile, the other conduit 13b is connected, via the fluid pressure adjusting means 14, with a conduit 16b leading to a wheel brake 18B of the front right wheel FR and a conduit 16c leading to a wheel brake 18C of the rear left wheel RL.

Figure 4:
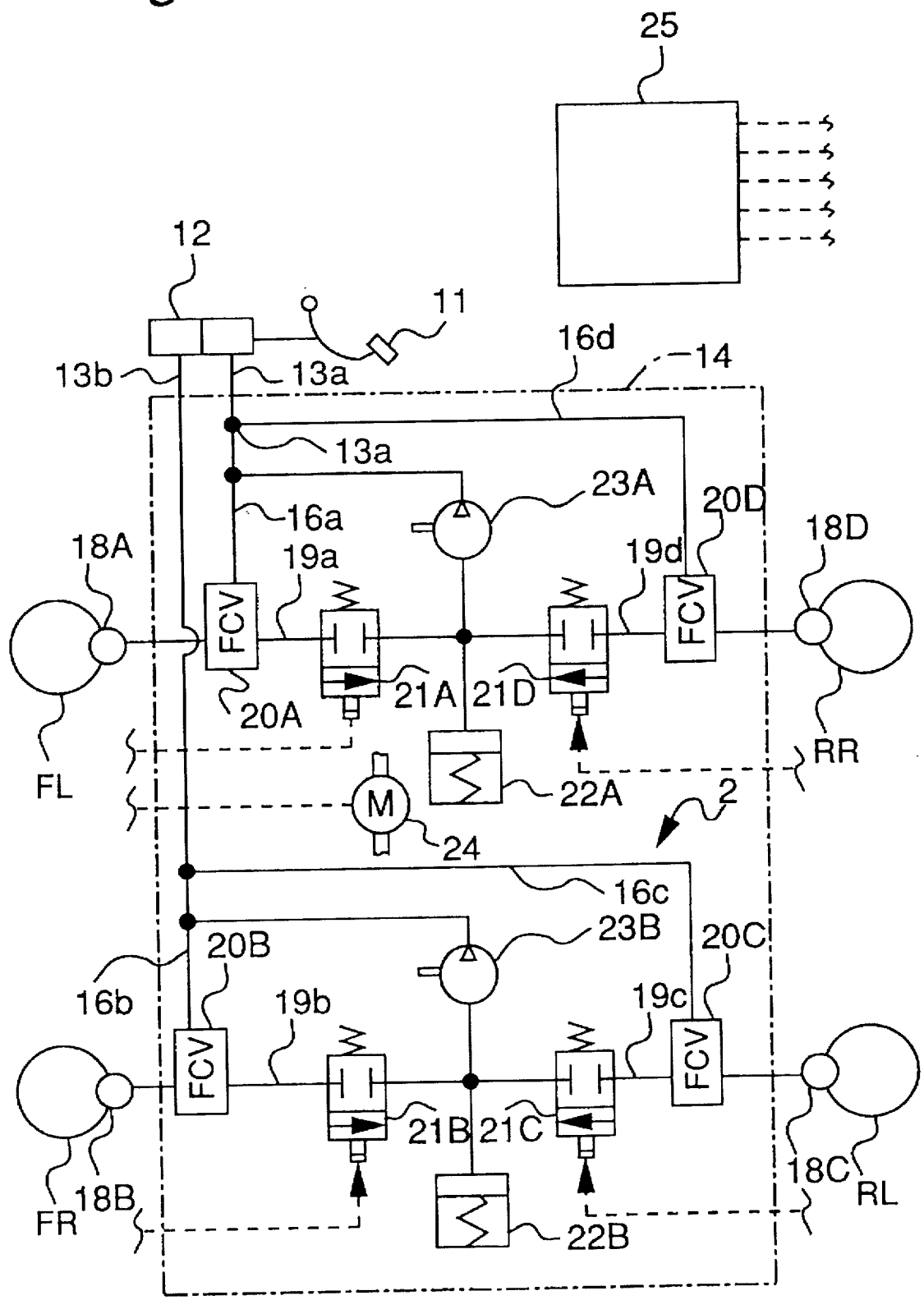
FIG. 4 is a schematic view of a fluid pressure adjusting means employed in the antiskid control device of FIG. 1.

The fluid pressure adjusting means 14 is actuated by the drive signal DS from the electronic control unit 25 so as to adjust fluid pressure of the wheel brakes 18A, 18B, 18C and 18D of the front left and right wheels FL and FR and the rear left and right wheels RL and RR. As shown in FIG. 4, the fluid pressure adjusting means 14 is of return flow type. In FIG. 4, the conduit 13a is connected with the conduits 16a and 16d in the fluid pressure adjusting means 14. A return flow path 19a branches off from the conduit 16a and then, is connected with a location of the conduit 16a disposed between a branch point of the return flow path 19a and the master cylinder 12. Likewise, a return flow path 19d branches off from the conduit 16d and then, is connected with a location of the conduit 16d disposed between a branch point of the return flow path 19d and the master cylinder 12. Inlet valves 20A and 20D formed by flow control valves are, respectively, provided at the branch points of the return flow paths 19a and 19d.

The flow return paths 19a and 19d are, respectively, connected with a first reservoir 22A through outlet valves 21A and 21D each formed by an ON/OFF type normally closed solenoid valve. Working fluid discharged from the wheel brakes 18A and 18D at the time of depressurization of antiskid control is stored in the first reservoir 22A. The working fluid is pumped up from the first reservoir 22A by a first pump 23A so as to be returned to the master cylinder 12.

On the other hand, the conduit 13b is also connected with the conduits 16b and 16c in the fluid pressure adjusting means 14 in the same manner as the conduit 13a. Similarly, inlet valves 20B and 20C each formed by a flow control valve are provided at branch points of return flow paths 19b and 19c, respectively. Outlet valves 21B and 21C each formed by an ON/OFF type normally closed solenoid valve are provided in the course of the return paths 19b and 19c, respectively. In addition, a second reservoir 22B is provided so as to be connected, through a second pump 23B, with the master cylinder 12. Therefore, working fluid discharged from the wheel brakes 18B and 18C is stored in the second reservoir 22B and is pumped up from the second reservoir 22B by the second pump 23B so as to be returned to the master cylinder 12.

The first and second pumps 23A and 23B are known plunger pumps driven by a driving motor 24. However, the plunger pumps 23A and 23B are not restricted to the plunger pumps but may also be formed by pumps of other types.

The inlet valves 20A to 20D and the outlet valves 21A to 21D of the fluid pressure adjusting means 14, which correspond to the wheels FL, FR, RL and RR, respectively, constitute actuators $ACT_0$, $ACT_1$, $ACT_2$ and $ACT_3$ in FIG.

2. During antiskid control, closing and opening of the outlet valves 21A to 21D are controlled by pressure increase and reduction signals outputted from pressure increase and reduction setting means $SOL_0$, $SOL_1$, $SOL_2$ and $SOL_3$. If the outlet valves 21A to 21D are in closed state, working fluid is supplied from the master cylinder 12 to the wheel brakes 18A to 18D so as to increase brake fluid pressure. On the other hand, if the outlet valves 21A to 21D are opened, working fluid in the wheel brakes 18A to 18D is discharged into the reservoirs 22A and 22B so as to reduce brake fluid pressure.

Meanwhile, the fluid pressure adjusting means 14 is not restricted to the above mentioned arrangement. For example, each of the inlet valves 20A to 20D may be formed by an ON/OFF type normally open solenoid valve. In this case, if the inlet valves are opened and the outlet valves are closed during antiskid control, brake fluid pressure is increased. On the contrary, if the inlet valves are closed and the outlet valves are opened, brake fluid pressure is reduced. Furthermore, if both the inlet valves and the outlet valves are closed, brake fluid pressure is held. Meanwhile, the fluid pressure adjusting means 14 may be of volume increase type in which a piston is provided and braking volume is increased or reduced upon movement of the piston so as to reduce or increase brake fluid pressure.

In FIG. 1, wheel speed sensors $S_0$, $S_1$, $S_2$ and $S_3$ outputs to the electronic control unit 25 pulse signals having frequencies proportional to rotational speeds of the front left and right wheels FL and FR and the rear left and right wheels RL and RR, respectively. The wheel speed sensors $S_0$ to $S_3$ are, respectively, secured to the axles 6a, 6b, 8a and 8b. Although not specifically shown, each of the wheel speed sensors $S_0$ to $S_3$ includes a disk made of magnetic material and having a serrated outer periphery and a magnetic pickup disposed in the vicinity of this disk.

A longitudinal acceleration sensor GS detects a longitudinal acceleration of the motor vehicle and outputs the longitudinal acceleration to the electronic control unit 25. When the driver kicks the brake pedal 11, a brake switch BSW outputs to the electronic control unit 25 a high-level brake signal BS indicating that the brake pedal 11 is being kicked. When the brake pedal 11 is not being kicked by the driver, the brake switch BS outputs a low-level brake signal BS to the electronic control unit 25.

The electronic control unit 25 is formed by a microcomputer and includes a wheel and vehicle body behavior calculating means CAL, a drive mode judging means DJDG, antiskid control decision means $C_0$, $C_1$, $C_2$ and $C_3$, first to fourth low-selection means SL1, SL2, SL3 and SL4, the pressure increase and reduction setting means $SOL_0$, $SOL_1$, $SOL_2$ and $SOL_3$, an antiskid control changeover means CSW and a control state judging means ALJDG.

The wheel and vehicle body behavior calculating means CAL calculates wheel speeds $SPEED_0$, $SPEED_1$, $SPEED_2$ and $SPEED_3$ of the front left and right wheels FL and FR and the rear left and right wheels RL and RR on the basis of the pulse signals outputted by the wheel speed sensors $S_0$ to $S_3$ and outputs the calculated wheel speeds $SPEED_0$ to $SPEED_3$ to the antiskid control decision means $C_0$, $C_1$, $C_2$ and $C_3$, respectively. Meanwhile the wheel and vehicle body behavior calculating means CAL outputs the wheel speeds $SPEED_0$ and $SPEED_1$ of the front left and right wheels FL and FR to an average front wheel speed calculating means SfCAL to be described later and outputs the wheel speeds $SPEED_2$ and $SPEED_3$ of the rear left and right wheels RL and RR to an average rear wheel speed calculating means SrCAL to be described later.

Meanwhile, the wheel and vehicle body behavior calculating means CAL calculates wheel acceleration and deceleration $\{d(SPEED_i)/dt\}$ (i=0–3) obtained by differentiating the wheel speeds $SPEED_0$ to $SPEED_3$ with respect to time and outputs the calculated wheel acceleration and deceleration $\{d(SPEED_i)/dt\}$ to the antiskid control decision means $C_0$ to $C_3$. In the following description, sign of the wheel acceleration and deceleration $\{d(SPEED_i)/dt\}$ is set to be positive for acceleration and negative for deceleration.

Furthermore, the wheel and vehicle body behavior calculating means CAL calculates an estimated value of a vehicle body speed, i.e., an estimated vehicle body speed VREF from the wheel speeds $SPEED_0$ to $SPEED_3$ and outputs the estimated vehicle body speed VREF to the antiskid control decision means $C_0$ to $C_3$. This estimated vehicle body speed VREF is calculated by known procedures. For example, a maximum value of the wheel speeds $SPEED_0$ to $SPEED_3$ may be set as the estimated vehicle body speed VREF.

In addition, the wheel and vehicle body behavior calculating means CAL calculates a vehicle body deceleration GCEL from an output of the longitudinal acceleration sensor GS and outputs the calculated vehicle body deceleration GCEL to a judgement means JDG of the drive mode judging means DJDG. In the following description, sign of the vehicle body deceleration GCEL is set to be positive for deceleration and negative for acceleration.

As indicated by the following equation (1), the average front wheel calculating means SfCAL calculates an average front wheel speed Sf which is an average of the wheel speeds $SPEED_0$ and $SPEED_1$ of the front left and right wheels FL and FR. Then, the average front wheel calculating means SfCAL outputs this average wheel speed Sf to a longitudinal speed difference calculating means SBTCAL of the drive mode judging means DJDG.

$$Sf=(SPEED_0+SPEED_1)/2 \qquad (1)$$

Likewise, as indicated by the following equation (2), the average rear wheel speed calculating means SrCAL calculates an average rear wheel speed Sr which is an average of the wheel speeds $SPEED_2$ and $SPEED_3$ of the rear left and right wheels RL and RR. Then, the average rear wheel speed calculating means SrCAL outputs this average rear wheel speed Sr to the longitudinal speed difference calculating means SBTCAL of the drive mode judging means DJDG.

$$Sr=(SPEED_2+SPEED_3)/2 \qquad (2)$$

In the first embodiment, the drive mode judging means DJDG includes the longitudinal speed difference calculating means SBTCAL, a smoothed longitudinal speed difference calculating means FLTR and the judgement means JDG. The average front wheel speed Sf and the average rear wheel speed Sr are inputted to the longitudinal speed difference calculating means SBTCAL. As indicated by the following equation (3), the longitudinal speed difference calculating means SBTCAL calculates a longitudinal speed difference Vd which is a difference between the average front wheel speed Sf and the average rear wheel speed Sr. Then, the longitudinal speed difference calculating means SBTCAL outputs this longitudinal speed difference Vd to the smoothed longitudinal speed difference calculating means FLTR.

$$Vd=Sf-Sr \qquad (3)$$

The smoothed longitudinal speed difference calculating means FLTR calculates a smoothed longitudinal speed difference Vdf through filtering of the longitudinal speed difference Vd and outputs this smoothed longitudinal speed difference Vdf to the judgement means JDG. In the first embodiment, the smoothed longitudinal speed difference Vdf is calculated by subjecting the longitudinal speed difference Vd to low-pass filtering as indicated by the following equation (4).

$$Vdf = Vdf + (1/k) \times (Vd - Vdf) \tag{4}$$

In the above equation, the smoothed longitudinal speed difference Vdf in the left member represents a smoothed longitudinal speed difference in this control cycle, while the underlined smoothed longitudinal speed difference Vdf in the right member represents a smoothed longitudinal speed difference in the preceding control cycle. Meanwhile, in the equation (4), k denotes a filter constant larger than 1, i.e., k>1. As the filter constant k is increased, degree of smoothing becomes larger and thus, oscillatory component of the longitudinal speed difference Vd is removed further. However, smoothing of the longitudinal speed difference Vd by the smoothed longitudinal speed difference calculating means FLTR is not restricted to low-pass filtering referred to above but may also be performed by any filtering capable of removing oscillatory component of the longitudinal speed difference Vd.

When the smoothed longitudinal speed difference Vdf falls out of a range between an upper threshold value $Vth_1$ and a lower threshold value $Vth_2$, the judgement means JDG judges that actual drive mode of the motor vehicle is 2WD and sets a judgement flag FLAG to "1" corresponding to 2WD. On the contrary, when the smoothed longitudinal speed difference Vdf falls within the above mentioned range, the judgement means JDG judges that actual drive mode of the motor vehicle may not be 2WD and sets the judgement flag FLAG to "0". This judgement flag FLAG is outputted to the antiskid control changeover means CSW. The brake signal BS is inputted from the brake switch BSW to the judgement means JDG. The judgement means JDG detects start of braking upon change of the brake signal from low level to high level and sets absolute values of the upper threshold value $Vth_1$ and the lower threshold value $Vth_2$ large during a predetermined period from start of braking.

The judgement means JDG receives also the drive signal DS from the drive signal output means DSO. When the drive signal DS is at high level (4WD command), the judgement means JDG judges the drive modes of the motor vehicle. On the other hand, when the drive signal DS is at low level (2WD command), the judgment means JDG does not judge the drive modes of the motor vehicle.

Meanwhile, the judgement means JDG receives also an antiskid signal AL from the control state judging means ALJDG. When this antiskid signal AL is at high level indicating that antiskid control is being performed, the judgement means JDG judges the drive modes of the motor vehicle. On the other hand, when the antiskid signal is at low level indicating that antiskid control is not being performed, the judgement means JDG does not judge the drive modes of the motor vehicle.

Furthermore, the judgement means JDG receives the vehicle body deceleration GCEL from the wheel and vehicle body behavior calculating means CAL. When the vehicle body deceleration GCEL is not more than a predetermined constant g (g>0), the judgement means JDG judges the drive modes of the motor vehicle. However, when the vehicle body deceleration GCEL exceeds the predetermined constant g, the judgement means JDG does not judge the drive modes of the motor vehicle.

The antiskid control decision means $C_0$, $C_1$, $C_2$ and $C_3$ detects locking symptom of the wheels FL, FR, RL and RR from the estimated vehicle body speed VREF, the wheel speeds $SPEED_0$ to $SPEED_3$ and the wheel acceleration and deceleration $\{d(SPEED_i)/dt\}$, respectively. In this embodiment, when both of the following equations (5) and (6) are satisfied concurrently, the antiskid control decision means $C_0$, $C_1$, $C_2$ and $C_3$ decide that there is locking symptom and output signals commanding pressure reduction of the wheel brakes 18A to 18D at pressure reduction duties corresponding to the estimated vehicle body speed VREF and the wheel speeds $SPEED_0$ to $SPEED_3$.

$$VREF - SPEED_i > a1 + a2 \times VREF \tag{5}$$

$$\{d(SPEED_i)/dt\} < -b1 - b2 \times VREF \tag{6}$$

In the above equations (5) and (6), a1, a2, b1 and b2 denote positive constants, respectively.

On the other hand, when at least one of the equations (5) and (6) is not satisfied, the antiskid control decision means $C_0$ to $C_3$ decide that locking symptom has disappeared and output signals commanding pressure increase of the wheel brakes 18A to 18D at pressure increase duties corresponding to the estimated vehicle body speed VREF and the wheel speeds $SPEED_0$ to $SPEED_3$. The signal of the antiskid control decision means $C_0$ for the front left wheel FL is outputted to the pressure increase and reduction setting means $SOL_0$ and the second low-selection means SL2. Meanwhile, the signal of the antiskid control decision means $C_1$ for the front right wheel FR is outputted to the pressure increase and reduction setting means $SOL_1$ and the third low-selection means SL3. Furthermore, the signals of the antiskid control decision means $C_2$ and $C_3$ for the rear left and right wheels RL and RR are inputted to the first low-selection means SL1.

The first to fourth low-selection means SL1 to SL4 output signals each corresponding to one in compared two of the wheels FL, FR, RL and RR having more manifest locking symptom than the other in the two. The signals of the antiskid control decision means $C_2$ and $C_3$ for the rear left and right wheels RL and RR are inputted to the first low-selection means SL1, while an output of the first low-selection means SL1 is applied to a first input A1 of the antiskid control changeover means CSW and the second and third low-selection means SL2 and SL3.

The signal of the antiskid control decision means C0 for the front left wheel FL and the signal from the first low-selection means SL1 are inputted to the second low-selection means SL2, while an output of the second low-selection means SL2 is applied to the fourth low-selection means SL4. The signal of the antiskid control decision means $C_1$ and the signal from the first low-selection means SL1 are inputted to the third low-selection means SL3, while an output of the third low-selection means SL3 is applied to the fourth low-selection means SL4. The signals from the second and third low-selection means SL2 and SL3 are inputted to the fourth low-selection means SL4, while an output of the fourth low-selection means SL4 is applied to a second input A2 of the antiskid control changeover means CSW.

The antiskid control changeover means CSW includes the first and second inputs A1 and A2 and an output B. The first input A1 is connected to the first low-selection means SL1 and the second input A2 is connected to the fourth low-selection means SL4. Meanwhile, the output B is connected to the pressure increase and reduction setting means $SOL_2$ and $SOL_3$. When the drive signal DS from the drive signal output means DSO is at low level (2WD command), the antiskid control changeover means CSW connects the first input A1 and the output B with each other irrespective of value of the judgement flag FLAG from the drive mode judging means DJDG. On the other hand, when the drive signal DS is at high level (4WD command), the antiskid control changeover means CSW connects the second input A2 and the output B with each other if the judgement flag FLAG from the drive mode judging means DJDG is "0" indicative of 4WD. Meanwhile, if the judgement flag FLAG from the drive mode judging means DJDG is "1" indicative of 2WD, the antiskid control changeover means CSW connects the first input A1 and the output B with each other.

Antiskid control for 4WD is performed as follows. Namely, in case the second input A2 and the output B of the antiskid control changeover means CSW are connected to each other, the signals from the antiskid control decision means $C_0$ and $C_1$ for the front left and right wheels FL and FR are directly inputted to the pressure increase and reduction setting means $SOL_0$ and $SOL_1$, respectively. One of the signals of the antiskid control decision means $C_0$ to $C_3$, which has the most manifest locking symptom in these signals, is inputted to the pressure increase and reduction setting means $SOL_2$ and $SOL_3$ for the rear left and right wheels RL and RR.

Meanwhile, antiskid control for 2WD is performed as follows. Namely, in case the first input A1 and the output B of the antiskid control changeover means CSW are connected to each other, the signals from the antiskid control decision means $C_0$ and $C_1$ for the front left and right wheels FL and FR are directly inputted to the pressure increase and reduction setting means $SOL_0$ and $SOL_1$, respectively. One of the signals of the antiskid control decision means $C_2$ and $C_3$, which has more manifest locking symptom than the other of these signals, is inputted to the pressure increase and reduction setting means $SOL_2$ and $SOL_3$ for the rear left and right wheels RL and RR.

The pressure increase and reduction setting means $SOL_0$ to $SOL_3$ set opening and closing time periods of the outlet valves 21A to 21D of the actuators $ACT_0$ to $ACT_3$ on the basis of the signals inputted to the pressure increase and reduction setting means $SOL_0$ to $SOL_3$ and output, as the pressure increase and reduction signals, the set opening and closing time periods to the actuators $ACT_0$ to $ACT_3$. In case any one of the pressure increase and reduction signals outputted by the pressure increase and reduction setting means $SOL_1$ to $SOL_3$ indicates pressure reduction, the control state judging means ALJDG judges that antiskid control is being performed for a corresponding one of the wheels FL, FR, RL and RR and outputs to the drive mode judging means DJDG the high-level antiskid signal AL indicating that antiskid control is being performed. On the contrary, if none of the pressure increase and reduction signals outputted by the pressure increase and reduction setting means $SOL_1$ to $SOL_3$ indicates pressure reduction, the control state judging means ALJDG outputs to the drive mode judging means DJDG the low-level antiskid signal AL indicating that antiskid control is not being performed.

Figure 5:
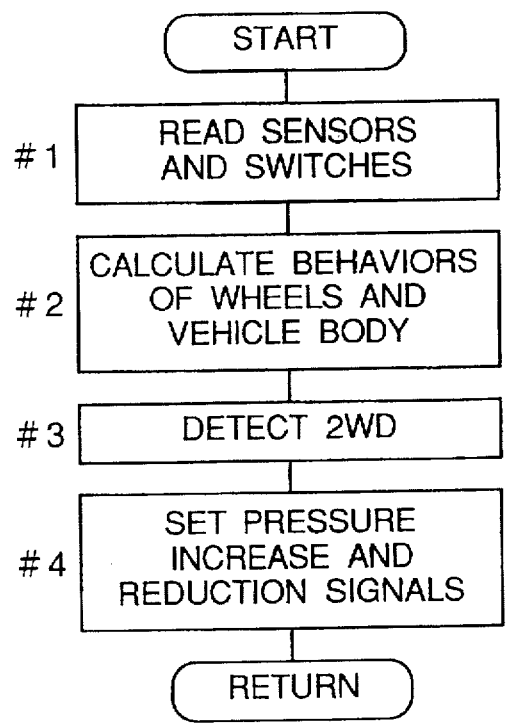
FIG. 5 is a flow chart showing operation of the antiskid control device of FIG. 1.
Figure 6:
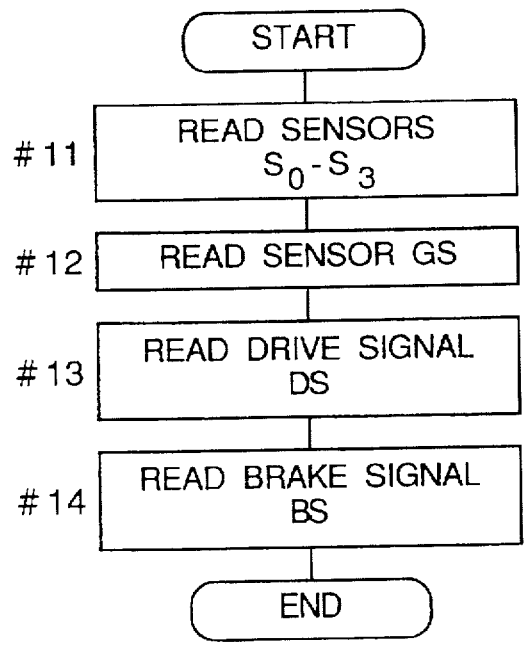
FIG. 6 is a flow chart showing processings of step #1 in the flow chart of FIG. 5.

Then, operation of the antiskid control device K1 is described with reference to flow charts of FIGS. 5 to 9. In the first embodiment, when a power source of the motor vehicle has been turned on, processings of steps #1 to #4 of FIG. 5 are repeated at a predetermined period (control cycle). initially, at step #1, the signals from the sensors and the switches are read. At step #1, processings shown in FIG. 6 are performed. Initially, at step #11 of FIG. 6, the wheel and vehicle body behavior calculating means CAL reads the pulse signals outputted by the wheel speed sensors $S_0$ to $S_3$. Then, at step #12, the wheel and vehicle body behavior calculating means CAL reads the output of the longitudinal acceleration sensor GS. At step #13, the judgement means JDG and the antiskid control changeover means CSW read the drive signal DS indicative of setting of the changeover switch SW. Furthermore, at step #14, the judgement means JDG reads the brake signal BS from the brake switch BSW.

Figure 7:
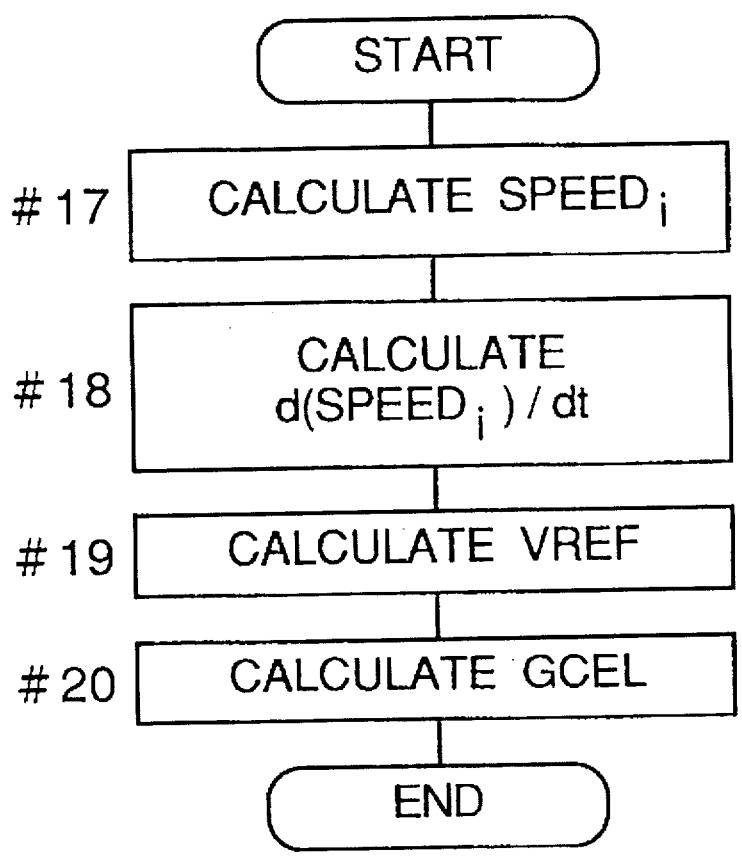
FIG. 7 is a flow chart showing processings of step #2 in the flow chart of FIG. 5.

Then, at step #2 of FIG. 5, the wheel and vehicle body behavior calculating means CAL calculates behaviors of the wheels and behaviors of the vehicle body. At step #2, processings shown in FIG. 7 are performed initially, at step #17 of FIG. 7, the wheel and vehicle body behavior calculating means CAL calculates the wheel speeds $SPEED_0$ to $SPEED_3$ from the outputs of the wheel speed sensors $S_0$ to $S_3$ and outputs the wheel speeds $SPEED_0$ to $SPEED_3$ to the antiskid control decision means $C_0$ to $C_3$. At the same time, the wheel and vehicle body behavior calculating means CAL outputs the wheel speeds $SPEED_0$ and $SPEED_1$ to the average front wheel speed calculating means SfCAL and the wheel speeds $SPEED_2$ and $SPEED_3$ to the average rear wheel speed calculating means SrCAL. Then, at step #18, the wheel and vehicle body behavior calculating means CAL calculates the wheel accelerations and decelerations $\{d(SPEED_0)/dt\}$ to $\{d(SPEED_3)/dt\}$ from the wheel speeds $SPEED_0$ to $SPEED_3$, respectively and outputs the wheel accelerations and decelerations $\{d(SPEED_0)/dt\}$ to $\{d(SPEED_3)/dt\}$ to the antiskid control decision means $C_0$ to $C_3$, respectively. At step #19, the wheel and vehicle body behavior calculating means CAL calculates the estimated vehicle body speed VREF from the wheel speeds $SPEED_0$ to $SPEED_3$ and outputs the estimated vehicle body speed VREF to the antiskid control decision means $C_0$ to $C_3$. At step #20, the wheel and vehicle body behavior calculating means CAL calculates the vehicle body deceleration GCEL from the output of the longitudinal acceleration sensor GS and outputs the vehicle body deceleration GCEL to the judgement means JDG.

Figure 8:
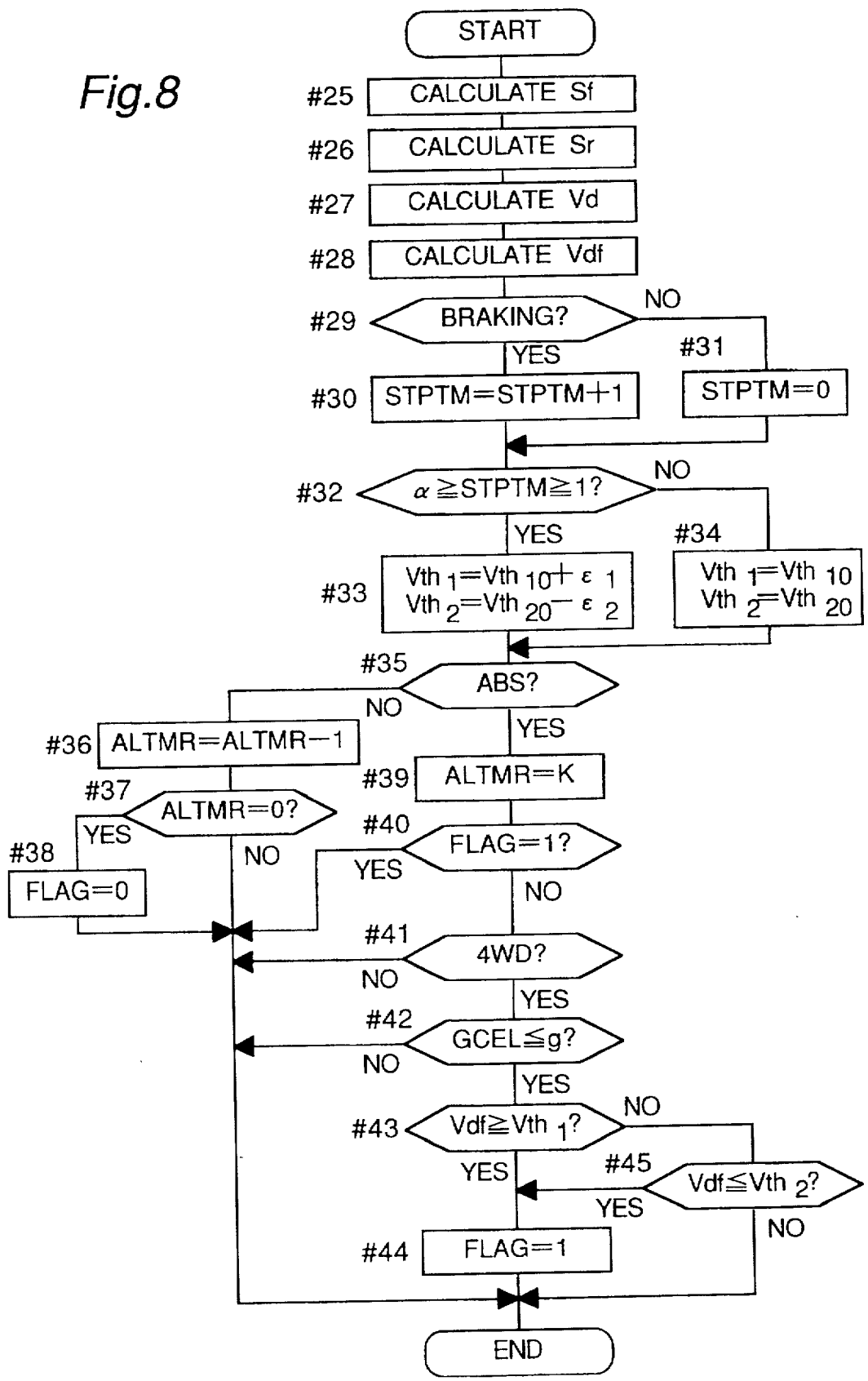
FIG. 8 is a flow chart showing processings of step #3 in the flow chart of FIG. 5.

At step #3 of FIG. 5, the drive mode judging means DJDG judges whether or not actual drive mode of the motor vehicle body is 2WD. At step #3, processings shown in FIG. 8 are performed. Initially, at step #25 of FIG. 8, the average front wheel speed calculating means SfCAL calculates the average front wheel speed Sf from the equation (1) referred to earlier and outputs the average front wheel speed Sf to the longitudinal speed difference calculating means SBTCAL. At step #26, the average rear wheel speed calculating means SrCAL calculates the average rear wheel speed SrCAL from the earlier mentioned equation (2) and outputs the average rear wheel speed Sr to the longitudinal speed difference calculating means SBTCAL. At step #27, the longitudinal speed difference calculating means SBTCAL calculates the longitudinal speed difference Vd from the above mentioned equation (3) and outputs the longitudinal speed difference Vd to the smoothed longitudinal speed difference calculating means FLTR. Subsequently, at step #28, on the basis of the above mentioned equation (4), the smoothed longitudinal speed difference calculating means FLTR calculates the smoothed longitudinal speed difference Vdf by subjecting the longitudinal speed difference Vd to low-pass filtering. At step #29, on the basis of the brake signal BS from the brake switch BSW, the judgement means JDG judges whether or not the motor vehicle is being braked. In case the motor vehicle is being braked, namely, the brake signal BS is at high level, the program flow proceeds to step #30. In case the motor vehicle is not being braked, namely, the brake signal BS is at low level, the program flow proceeds to step #31.

At step #30, "1" is added to count of a braking timer STPTM. At step #31, count of the braking timer STPTM is cleared to "0". If it is found at step #32 that count of the braking timer STPTM satisfies the relation ($\alpha \geq$ STPTM $\geq 1$), it is judged that it is within a predetermined period from start of braking and thus, the program flow proceeds to step #33. On the other hand, if count of the braking timer STPTM falls out of the above mentioned range, it is judged that braking is not being performed or the predetermined period has elapsed from start of braking and thus, the program flow proceeds to step #34. At step #33, the upper threshold value $Vth_1$ for the smoothed longitudinal speed difference Vdf is set to a sum of a standard value $Vth_{10}$ and $\epsilon 1$, while the lower threshold value $Vth_2$ is set to a value obtained by subtracting $\epsilon 2$ from a standard value $Vth_{20}$. At this time, $\epsilon 1$ and $\epsilon 2$ are positive predetermined values. On the other hand, at step #34, the upper and lower threshold values $Vth_1$ and $Vth_2$ are set to the standard values $Vth_{10}$ and $Vth_{20}$, respectively without addition or subtraction and then, the program flow proceeds to step #35.

In the first embodiment, since absolute values of the upper and lower threshold values $Vth_1$ and $Vth_2$ for judging whether or not drive mode of the motor vehicle is 2WD are set large during the predetermined period from start of braking, it is possible to prevent erroneous detection of 2WD occurring in the case where at an initial stage of braking, behaviors of the wheels are unstable, thereby resulting in large oscillations of the wheel speeds $SPEED_0$ to $SPEED_3$. At step #35, from the signal AL of the control state judging means ALJDG, the judgement means JDG judges whether or not antiskid control is being performed. If antiskid control is not being performed, namely, the antiskid signal AL is at low level, the program flow proceeds to step #36 without forming a judgement on the drive modes. On the contrary, if antiskid control is being performed, namely, the antiskid signal AL is at high level, the program flow proceeds to step #39.

After "1" has been subtracted from count of an antiskid timer ALTMR at step #36, the program flow proceeds to step #37. If it is found at step #37 that count of the antiskid timer ALTMR is "0", it is judged that antiskid control has not yet been performed or a sufficiently long period has elapsed from the last antiskid control. Then, at step #38, the judgement flag FLAG is set to "0". On the other hand, at step #39, count of the antiskid timer ALTMR is set to a sufficiently large predetermined value k. At step #40, the judgement flag FLAG is inspected. If the judgement flag FLAG is "1" at step #40, it is detected that not only antiskid control is being performed but actual drive mode of the motor vehicle is 2WD although the changeover switch SW has already been set to 4WD. Therefore, during antiskid control, a judgement on the drive modes is not formed such that the judgement flag FLAG is held at "1". On the other hand, when the judgement flag FLAG is "0" at step #40, the program flow proceeds to step #41.

At step #41, it is inspected from the drive signal DS whether the changeover switch SW is set to 2WD or 4WD. In case the changeover switch SW is set to 2WD, namely, the drive signal DS is at low level, a judgement on the drive modes is not formed. In case the changeover switch SW is set to 4WD, namely, the drive signal DS is at high level, the program flow proceeds to step #42. At step #42, the judgement means JDG inspects whether or not the vehicle body deceleration GCEL from the wheel and vehicle body behavior calculating means CAL is equal to a positive predetermined value g or less. In case the vehicle body deceleration GCEL is larger than the predetermined value g, it is judged that coefficient μ of friction of a road surface is not low and thus, a judgement on the drive modes is not formed. Meanwhile, in case the vehicle body deceleration GCEL is not more than the predetermined value g, the program flow proceeds to step #43.

At step #43, the smoothed longitudinal speed difference Vdf is compared with the upper threshold value $Vth_1$. If the smoothed longitudinal speed difference Vdf is not less than the upper threshold value $Vth_1$, it is judged that since difference between the average front wheel speed Vf and the average rear wheel speed Vr is sufficiently large, actual drive mode of the motor vehicle is 2WD and thus, the judgement flag FLAG is set to "1" at step #44. On the other hand, if the smoothed longitudinal speed difference Vdf is less than the upper threshold value $Vth_1$, the program flow proceeds to step #45. At step #45, the smoothed longitudinal speed difference Vdf is compared with the lower threshold value $Vth_2$. If the smoothed longitudinal speed difference Vdf is not more than the lower threshold value $Vth_2$, it is judged that difference between the average front wheel speed Vf and the average rear wheel speed Vr is sufficiently large and thus, the judgement flag FLAG is set to "1" at step #44.

Figure 9:
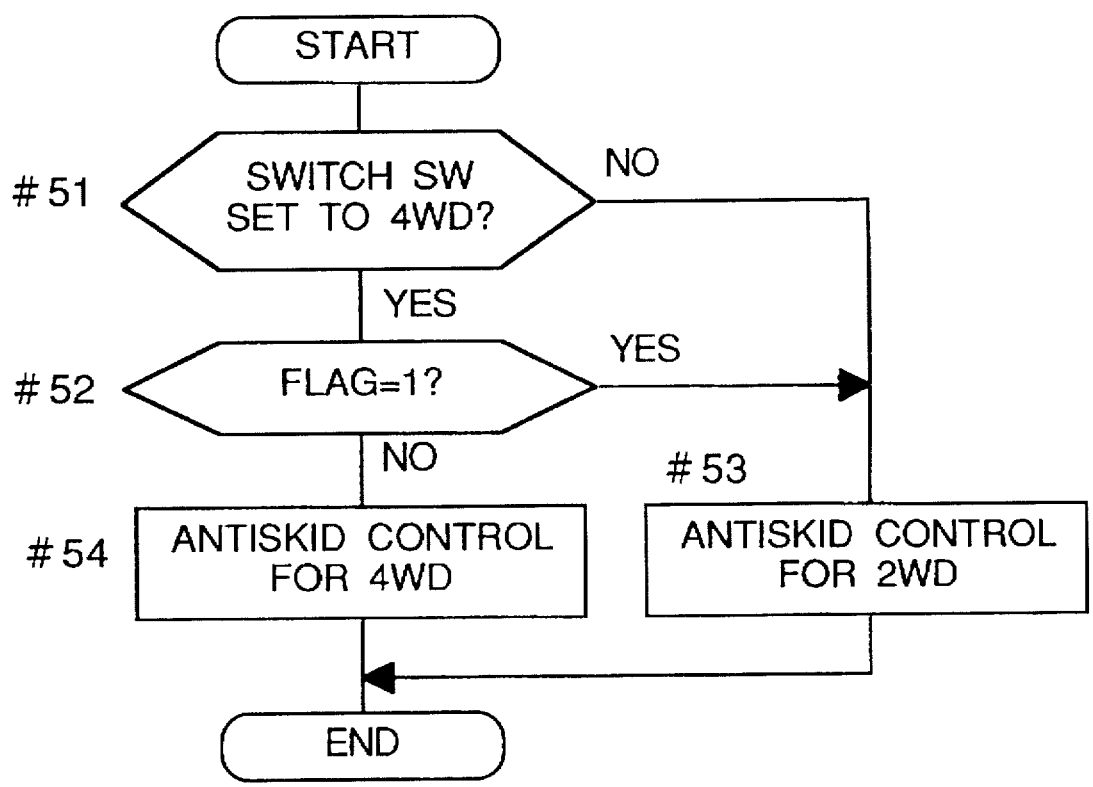
FIG. 9 is a flow chart showing processings of step #4 in the flow chart of FIG. 5.

At step #4 of FIG. 5, the pressure increase and reduction signals are set and outputted. At step #4, processings shown in FIG. 9 are performed. Initially, at step #51 of FIG. 9, the antiskid control changeover means CSW inspects the drive signal DS. If the drive signal DS is at high level, namely, the changeover switch SW is set to 4WD, the program flow proceeds to step #52. On the other hand, if the drive signal DS is at low level, namely, the changeover switch SW is set to 2WD, the program flow proceeds to step #53. At step #52, the judgement flag FLAG is inspected. If the judgement flag FLAG is "1", the changeover switch SW is set to 4WD but actual drive mode of the motor vehicle is judged 2WD, so that the program flow proceeds to step #53. Meanwhile, if the judgement flag FLAG is "0", the changeover switch SW is set to 4WD and actual drive mode of the motor vehicle is also 4WD, so that the program flow proceeds to step #54.

At step #53, antiskid control for 2WD is performed as follows. Namely, signals from the antiskid control decision means $C_0$ and $C_1$ are inputted to the pressure increase and reduction setting means $SOL_0$ and $SOL_1$ for the front left and right wheels FL and FR, respectively. Meanwhile, one of signals from the antiskid control decision means $C_2$ and $C_3$, which has more manifest locking symptom than the other of these signals, is inputted to the pressure increase and reduction setting means $SOL_2$ and $SOL_3$ for the rear left and right wheels RL and RR. The pressure increase and reduction setting means $SOL_0$ to $SOL_3$ set the pressure increase and reduction signals on the basis of the inputted signals and output the pressure increase and reduction signals to the actuators $ACT_0$ to $ACT_3$.

Meanwhile, at step #54, antiskid control for 4WD is performed as follows. Namely, signals from the antiskid control decision means $C_0$ and $C_1$ are inputted to the pressure increase and reduction setting means $SOL_0$ and $SOL_1$ for the front left and right wheels FL and FR, respectively. One of signals from the antiskid control decision means $C_0$ to $C_3$ for the front left and right wheels FL and FR and the rear left and right wheels RL and RR, which has the most manifest locking symptom in these signals, is inputted to the pressure increase and reduction setting means $SOL_2$ and $SOL_3$. The pressure increase and reduction setting means $SOL_0$ to $SOL_3$ set the pressure increase and reduction signals on the basis of the inputted signals and output the pressure increase and reduction signals to the actuators $ACT_0$ to $ACT_3$.

Figure 10:
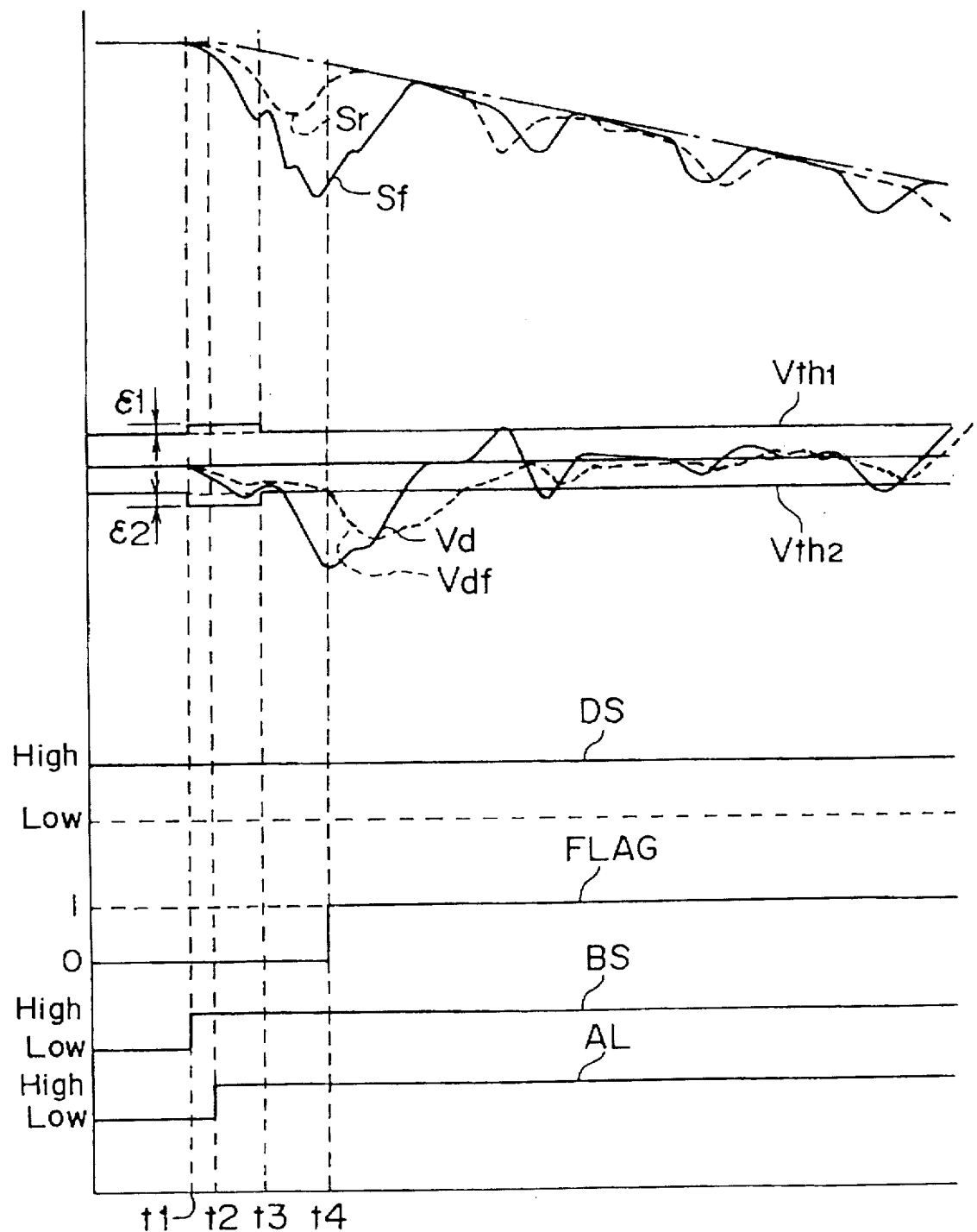
FIG. 10 is a diagram showing one example of control of the antiskid control device of FIG. 1.

FIG. 10 shows one example of control of the antiskid control device K1. In this example, the changeover switch SW is set to 4WD and the drive signal DS outputted by the drive signal output means DSO is at high level. At a time point t1, the brake pedal 11 is actuated so as to start braking of the motor vehicle. However, until a time point t3, absolute values of the upper threshold value $Vth_1$ and the lower threshold value $Vth_2$ are set large. Since behaviors of the wheels are unstable at an initial stage of braking, it is possible to positively prevent erroneous detection of 2WD by setting the upper and lower threshold values $Vth_1$ and $Vth_2$ as described above. When antiskid control is started at a time point t2 in response to detection of locking symptom, the drive mode judging means DJDG starts judging the drive modes. When the smoothed longitudinal speed difference Vdf exceeds the lower threshold value $Vth_2$ at a time point t4, the drive mode judging means DJDG sets the judgement flag FLAG to "1" by judging that the changeover switch SW is set to 4WD but actual drive mode of the motor vehicle is 2WD. This judgement flag FLAG is inputted to the antiskid control changeover means CSW as described above. As a result, the first input A1 and the output B of the antiskid control changeover means CSW are connected to each other and thus, antiskid control for 2WD is performed until antiskid control is finished.

In the first embodiment, even if the changeover switch SW is set to 4WD, actual drive mode of the motor vehicle is detected as being 2WD on the basis of the smoothed longitudinal speed difference Vdf obtained by smoothing through low-pass filtering as described above. Therefore, also in the case where the wheel speeds vary, the drive modes of the motor vehicle are judged positively and thus, antiskid control can be performed in accordance with the drive modes of the motor vehicle.

Meanwhile, in the first embodiment, since absolute values of the upper and lower threshold values $Vth_1$ and $Vth_2$ for judging 2WD are set large during the predetermined period from start of braking, it is possible to prevent erroneous detection of 2WD due to unstable behaviors of the wheels at an initial stage of braking.

Furthermore, in the first embodiment, if it is detected during antiskid control that actual drive mode of the motor vehicle is 2WD although the changeover switch SW has been once set to 4WD, antiskid control for 2WD is performed until antiskid control is finished. Therefore, since changeover from control for 2WD to control for 4WD is not performed during antiskid control, behaviors of the motor vehicle can be stabilized.

Moreover, in the first embodiment, since the drive modes of the motor vehicle are judged only when the vehicle body deceleration GCEL detected by the longitudinal acceleration sensor GS during antiskid control is not more than the set predetermined value, detection of 2WD is performed only for a road surface having low coefficient µ of friction, which requires changeover between antiskid control for 2WD and antiskid control for 4WD.

Figure 11:
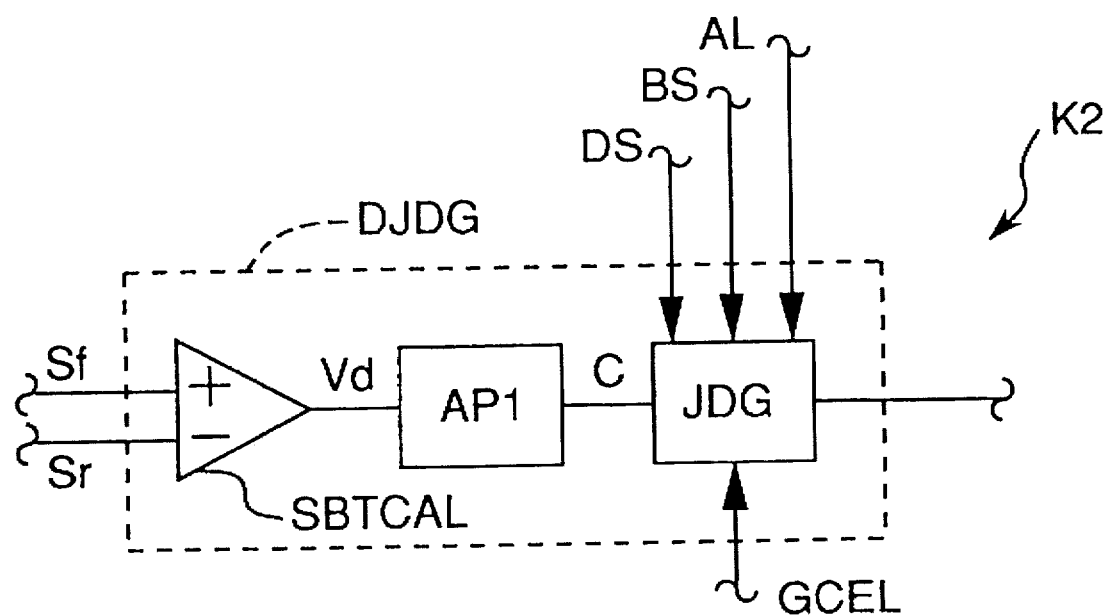
FIG. 11 is a fragmentary schematic view of an antiskid control device according to a second embodiment of the present invention.

FIG. 11 shows a drive mode judging means DJDG of an antiskid control device K2 according to a second embodiment of the present invention. The drive mode judging means DJDG of the antiskid control device K2 includes a longitudinal speed difference calculating means SBTCAL, an arithmetic means AP1 and a judgement means JDG. From the equation (3) referred to earlier in the same manner as the first embodiment, the longitudinal speed difference calculating means SBTCAL calculates the longitudinal speed difference Vd which is a difference between the average front wheel speed Sf and the average rear wheel speed Sr and outputs the longitudinal speed difference Vd to the arithmetic means AP1. When the longitudinal speed difference Vd is positive, the arithmetic means AP1 adds "1" to an arithmetic value C. On the contrary, when the longitudinal speed difference Vd is negative, the arithmetic means AP1 subtracts "1" from the arithmetic value C. Then, the arithmetic means AP1 outputs this arithmetic value C to the judgement means JDG. If this arithmetic value C falls within a range between a positive upper threshold value $Cth_1$ and a negative lower threshold value $Cth_2$, the judgement means JDG sets the judgement flag FLAG to "0". Meanwhile, if the arithmetic value C falls out of the range, the judgement means JDG sets the judgement flag FLAG to "1" corresponding to 2WD. Subsequently, the judgement means JDG outputs this judgement flag FLAG to the antiskid control changeover means CSW. Meanwhile, the judgement means JDG judges start of braking from the high-level brake signal BS and sets absolute values of the upper and lower threshold values $Cth_1$ and $Cth_2$ large during a predetermined period from start of braking. Since other constructions of the antiskid control device K2 are identical with those of the antiskid control device K1, the description is abbreviated for the sake of brevity.

Figure 12:
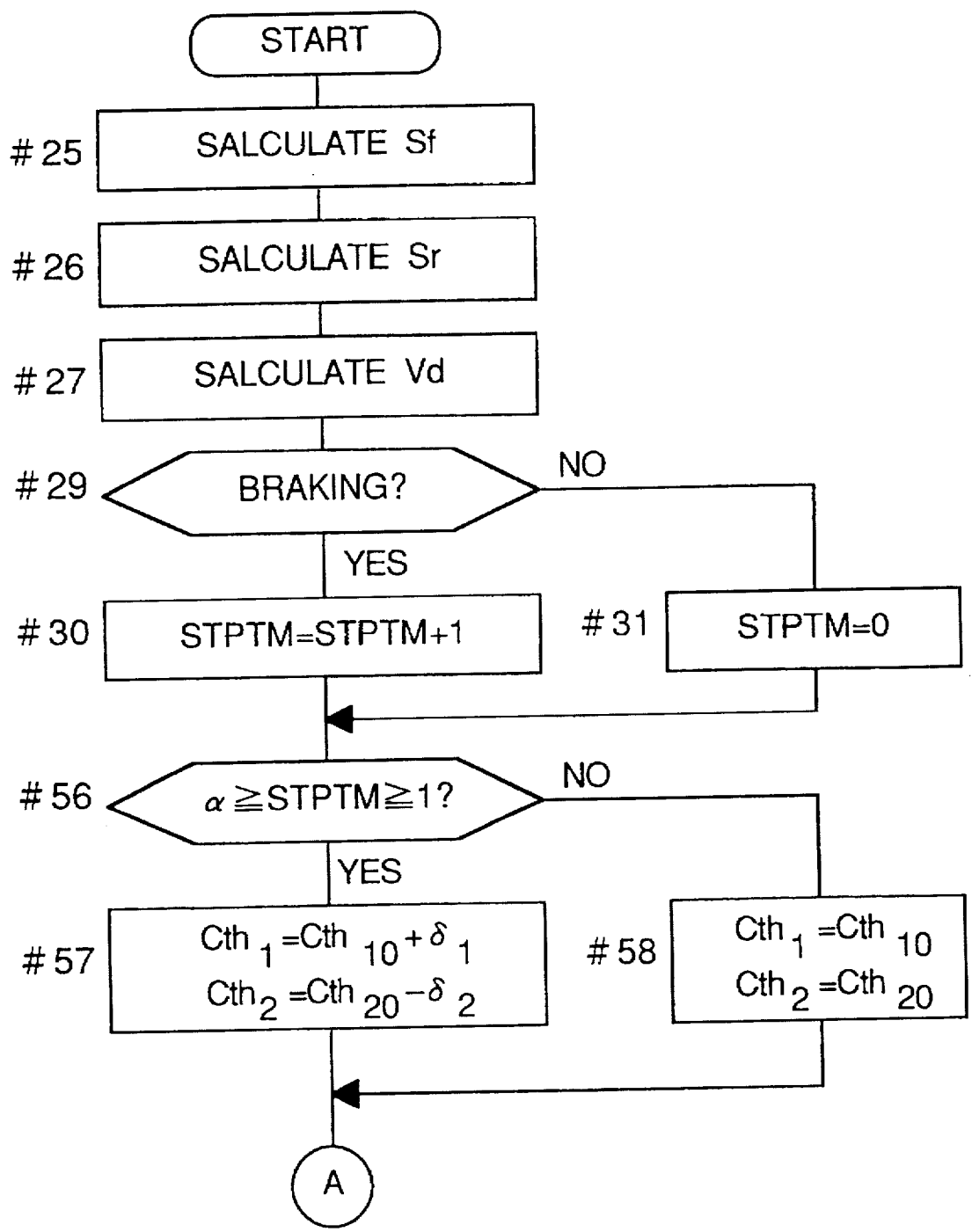
FIGS. 12 and 13 are flow charts showing operation of the antiskid control device of FIG. 11.

Then, operation of the antiskid control device K2 is described. Except for step #3 of FIG. 5, operation of the antiskid control device K2 is the same as that of the antiskid control device K1. At step #3 of the antiskid control device K2, processings shown in FIGS. 11 and 12 are performed. Steps #25 to #31 in FIG. 12 are identical with those of FIG. 8 for the first embodiment except that calculation of the smoothed longitudinal speed difference Vdf (step #28 of FIG. 8) is not performed in FIG. 12. If it is found at step #56 that count of the braking timer STPTM satisfies the relation ($\alpha \geq STPTM \geq 1$), it is judged that it is within a predetermined period from start of braking and thus, the program flow proceeds to step #57 at which the upper threshold value $Cth_1$ of the arithmetic value C is set to a sum of a standard value $Cth_1$ and a positive predetermined value δ1 and the lower threshold value $Cth_2$ of the arithmetic value C is set to a value obtained by subtracting a positive predetermined value δ2 from a standard value $Cth_{20}$.

Figure 13:
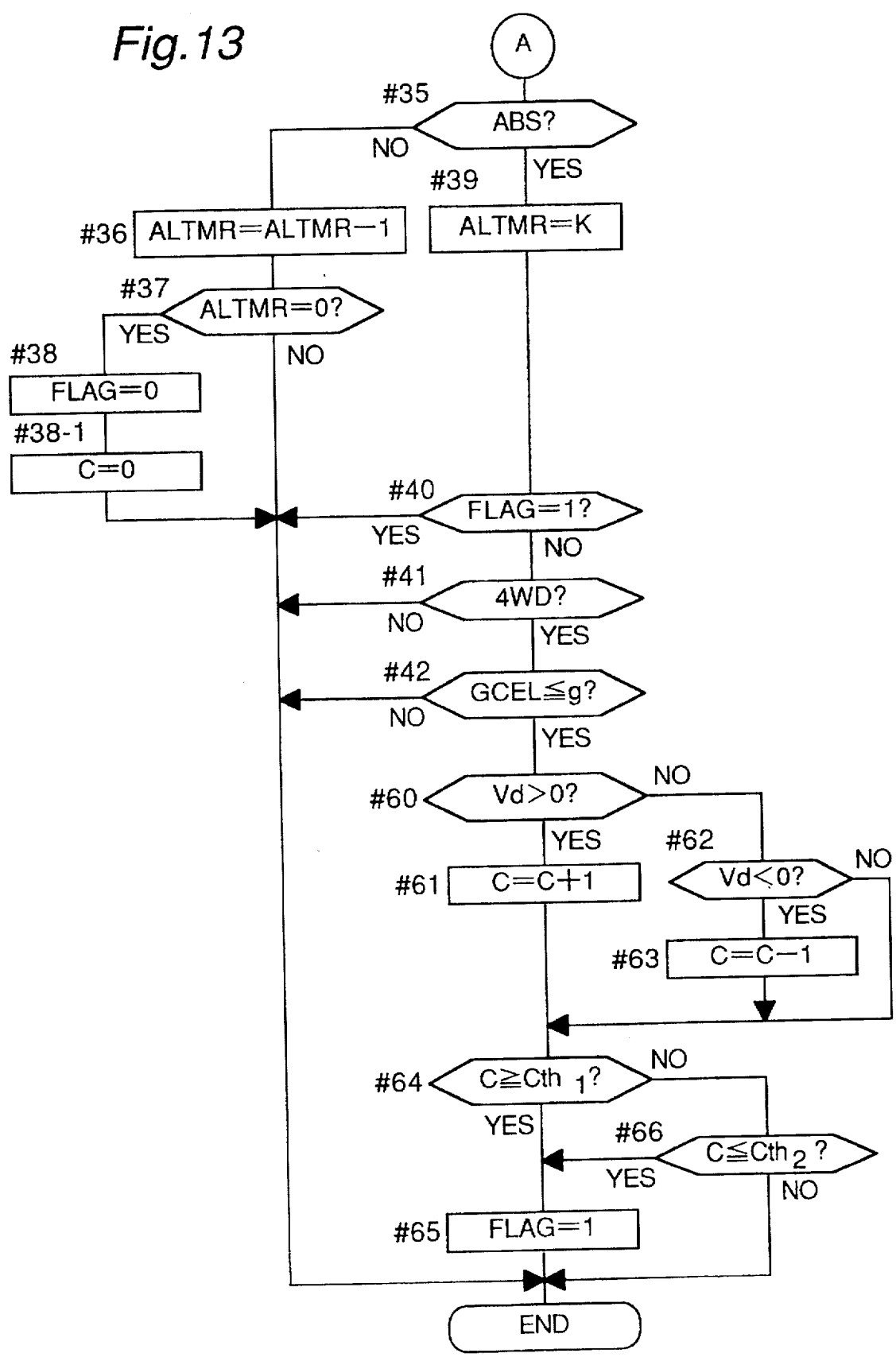

On the other hand, if count of the braking timer STPTM falls out of the above described range, it is judged that the predetermined period has elapsed from start of braking, so that the program flow proceeds to step #58 for setting the upper and lower threshold values $Cth_1$ and $Cth_2$ to the standard values $Cth_{10}$ and $Cth_{20}$, respectively without addition or subtraction and then, the program flow proceeds to step #35. Except for step #38-1 at which in case antiskid control has not yet been performed or a sufficiently long period has elapsed from the last antiskid control, the arithmetic value C is cleared to "0", processings from step #35 to step #42 in FIG. 13 are identical with those of FIG. 8 for the first embodiment. Also in the second embodiment, in case antiskid control is not being performed (step #35), the judgement flag FLAG has been set to "1" indicative of 2WD (step #40), the changeover switch SW is set to 2WD (step #41) and the vehicle body deceleration GCEL is larger than the predetermined value g (step #42), a judgement on the drive modes of the motor vehicle is not formed.

At step #60, it is inspected whether or not the longitudinal speed difference Vd is larger than "0". If the longitudinal speed difference Vd is larger than "0", namely, the longitudinal speed difference Vd is positive, the program flow proceeds to step #61. On the other hand, if the longitudinal speed difference Vd is not larger than "0", the program flow proceeds to step #62. At step #61, "1" is added to the arithmetic value C. Meanwhile, at step #62, it is inspected whether or not the longitudinal speed difference Vd is smaller than "0". In case the longitudinal speed difference Vd is smaller than "0", namely, the longitudinal speed difference Vd is negative, "1" is subtracted from the arithmetic value C at step #63.

At step #64, the arithmetic value C is compared with the upper threshold value $Cth_1$. In case the arithmetic value C is not less than the upper threshold value $Cth_1$, it is judged that since a state that the average front wheel speed Vf is larger than the average rear wheel speed Vr has lasted for a sufficiently long period, the changeover switch SW is set to 4WD but actual drive mode of the motor vehicle is 2WD, so that the judgement flag FLAG is set to 1 at step #65. On the other hand, if it is found at step #64 that the arithmetic value C is smaller than the upper threshold value $Cth_1$, the program flow proceeds to step #66. At step #66, the arithmetic value C is compared with the lower threshold value $Cth_2$. In case the arithmetic value C is not more than the lower threshold value $Cth_2$, it is judged that since a state that the average rear wheel speed Vr is larger than the average rear wheel speed Vf has lasted for a sufficiently long period, actual drive mode of the motor vehicle is 2WD, so that the program flow proceeds to step #65.

Figure 14:
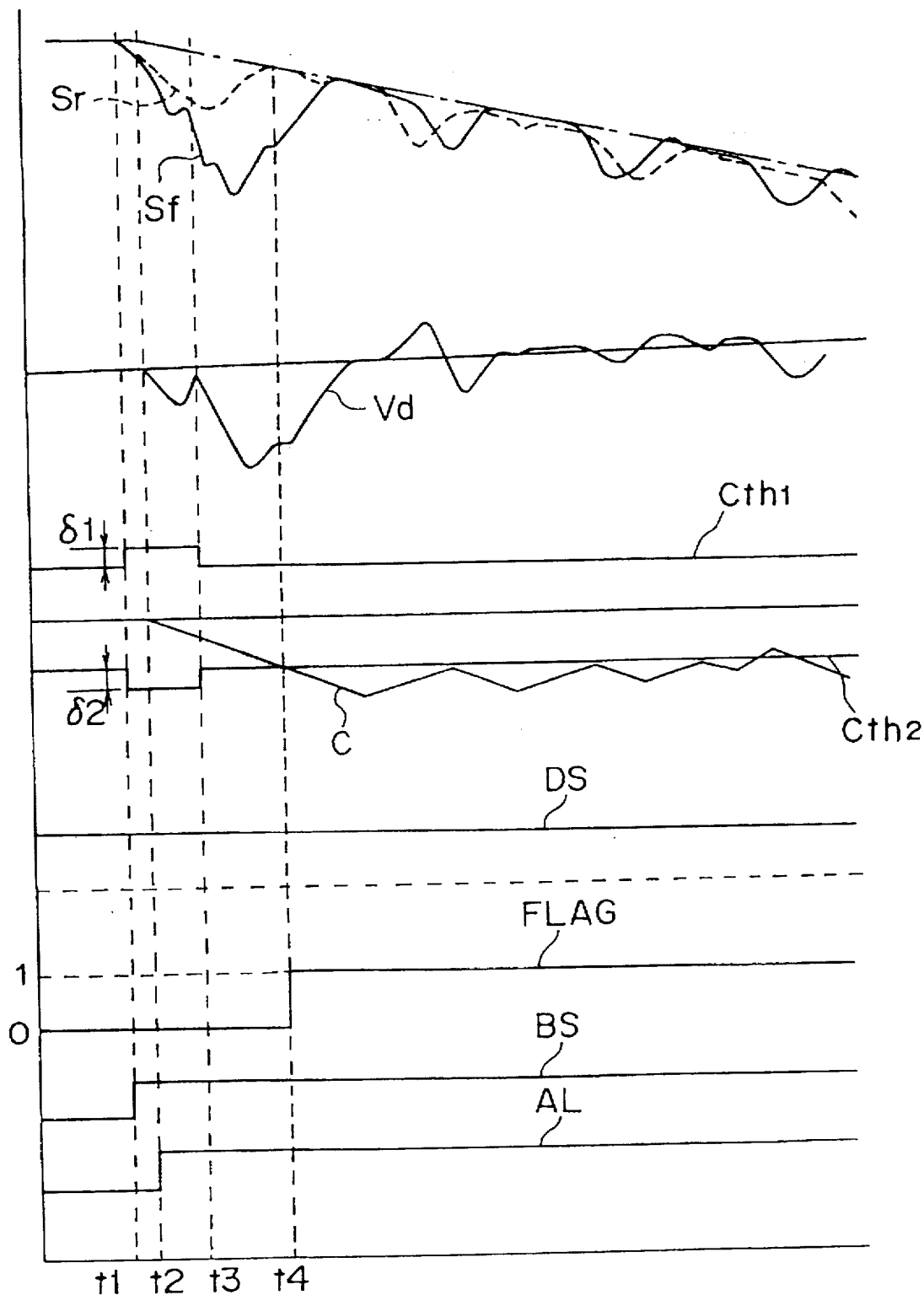
FIG. 14 is a diagram showing one example of control of the antiskid control device of FIG. 11.

FIG. 14 shows one example of control of the antiskid control device K2. In this example, the changeover switch SW is set to 4WD and the drive signal DS outputted by the drive signal output means DSO is at high level. At a time point t1, the brake pedal 11 is actuated so as to start braking of the motor vehicle. However, until a time point t3, absolute values of the upper and lower threshold values $Vth_1$ and $Vth_2$ of the arithmetic value C are set large. Therefore, at an initial stage of braking, the drive modes of the motor vehicle are judged as being 2WD only when a state that a difference between the average front wheel speed Vf and the average rear wheel speed Vr is large has lasted for a period longer than the predetermined period counted from start of braking. Thus, it is possible to positively prevent erroneous detection of the drive modes of the motor vehicle. Antiskid control is started at a time point t2 and the arithmetic value C drops below the lower threshold value $Cth_2$ at a time point t4. At this time, the drive mode judging means DJDG judges that the changeover switch SW is set to 4WD but actual drive mode of the motor vehicle is 2WD and sets the judgement flag FLAG to "1". Until antiskid control is finished from the time point t4, the first input A1 is connected to the output B in the antiskid control changeover means CSW such that antiskid control for 2WD is performed.

In the second embodiment, even if the changeover switch SW is set to 4WD, actual drive mode of the motor vehicle is detected as being 2WD on the basis of the arithmetic value C subjected to addition and subtraction when the longitudinal speed difference Vd is positive and negative, respectively, so that 2WD is detected reliably and accurately and thus, antiskid control can be performed in accordance with the drive modes of the motor vehicle.

Figure 15:
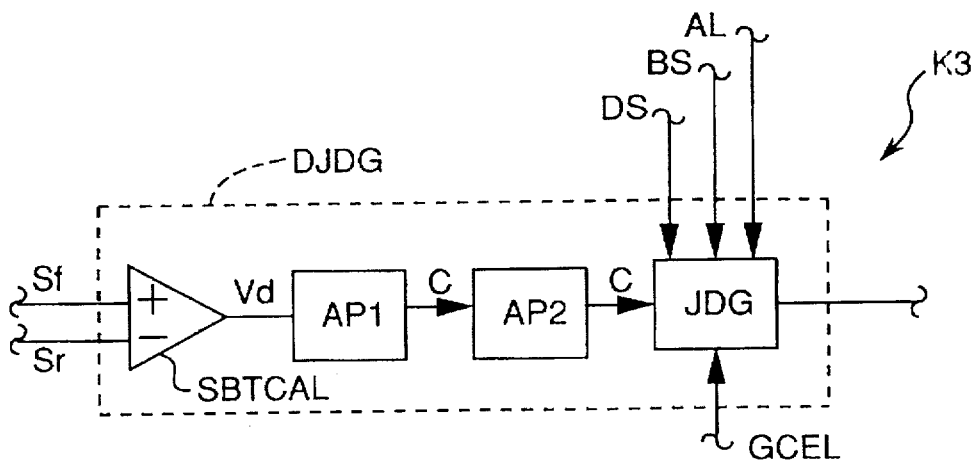
FIG. 15 is a fragmentary schematic view of an antiskid control device according to a third embodiment of the present invention.

FIG. 15 shows a drive mode judging means DJDG of an antiskid control device K3 according to a third embodiment of the present invention. The drive mode judging means DJDG of the antiskid control device K3 includes a longitudinal speed difference calculating means SBTCAL, a first arithmetic means AP1, a second arithmetic means AP2 and a judgement means JDG. When the longitudinal speed difference Vd is larger than a positive upper limit $\Delta\beta$, the first arithmetic means AP1 adds "1" to the arithmetic value C. Meanwhile, when the longitudinal speed difference Vd is smaller than a negative lower limit $-\Delta\beta$, the first arithmetic means AP1 subtracts "1" from the arithmetic value C. In other words, in the third embodiment, a range of $(\Delta\beta \geq C \geq -\Delta\beta)$ is set as an insensitive zone such that addition or subtraction of the arithmetic value C is not performed in case the longitudinal speed difference Vd falls within this insensitive range. The second arithmetic means AP2 inspects the arithmetic value C at an interval of a predetermined number N ($N \geq 2$) of the control cycles so as to subtract "1" from and add "1" to the arithmetic value C when the arithmetic value C is positive and negative, respectively. Since other constructions of the antiskid control device K3 are identical with those of the antiskid control device K2, the description is abbreviated for the sake of brevity.

Figure 16:
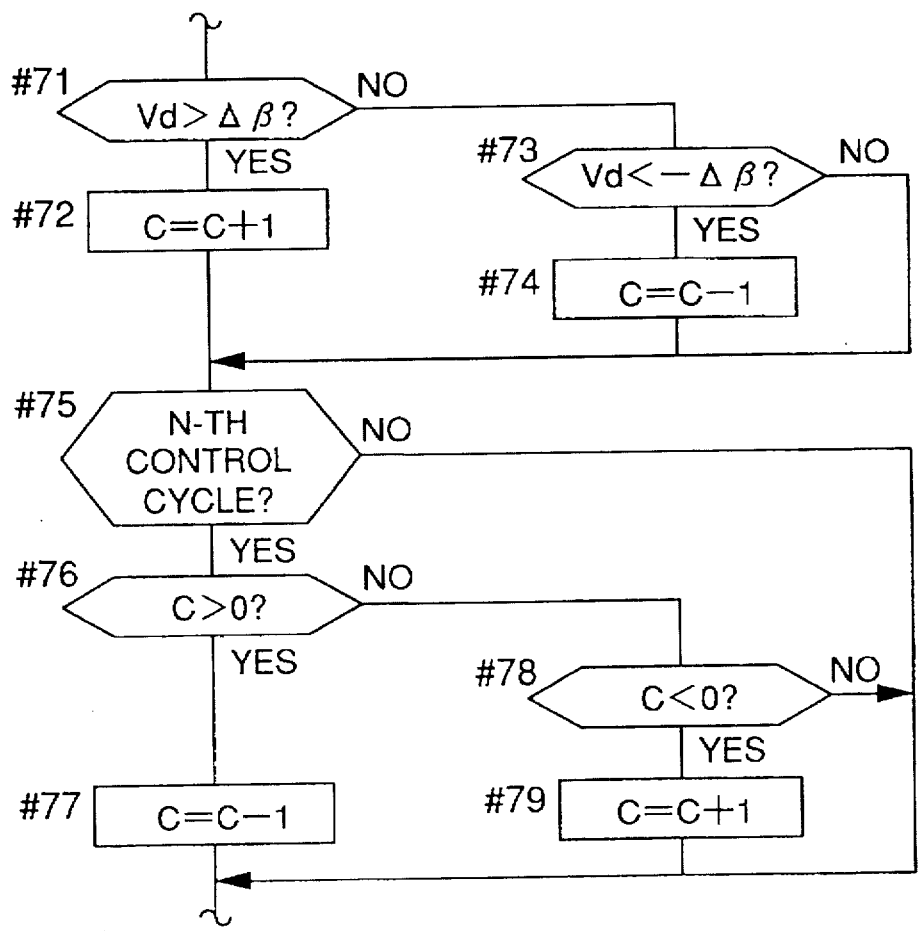
FIG. 16 is a flow chart showing one example of control of the antiskid control device of FIG. 15.

Then, operation of the antiskid control device K3 is described with reference to a flow chart of FIG. 16. Except that steps #60 to #63 in FIG. 13 are replaced by steps #71 to #79 in FIG. 16, operation of the antiskid control device K3 is identical with that of the antiskid control device K2. If it is found at step #71 that the longitudinal speed difference Vd is larger than the positive upper limit $\Delta\beta$, "1" is added to the arithmetic value C at step #72. Meanwhile, if the longitudinal speed difference Vd is not more than the upper limit $\Delta\beta$, the program flow proceeds to step #73. If it is found at step #73 that the longitudinal speed difference Vd is smaller than the negative lower limit $-\Delta\beta$, "1" is subtracted from the arithmetic value C. Then, if it is found at step #75 that the number of the control cycles has reached the predetermined number N, it is inspected at step #76 whether or not the arithmetic value C is positive. If the arithmetic value C is positive at step #76, "1" is subtracted from the arithmetic value C at step #77. On the other hand, if the arithmetic value C is not positive at step #76, it is inspected at step #78 whether or not the arithmetic value C is negative. If the arithmetic value C is negative at step #78, "1" is added to the arithmetic value C at step #79.

In the third embodiment, the range of $(\Delta\beta \geq C \geq -\Delta\beta)$ is set as an insensitive zone such that addition or subtraction of the arithmetic value C is not performed in case the longitudinal speed difference Vd falls within this insensitive range as described above. Accordingly, also when oscillations of the wheel speeds are large, erroneous detection of 2WD can be prevented.

Meanwhile, in the third embodiment, since the second arithmetic means AP2 performs addition and subtraction for the arithmetic value C oppositely to the first arithmetic means AP1 in accordance with whether the arithmetic value C is positive or negative, unnecessary addition or subtraction for the arithmetic value C due to temporary behaviors of the wheels can be prevented and thus, it is possible to judge 2WD more accurately.

Figure 17:
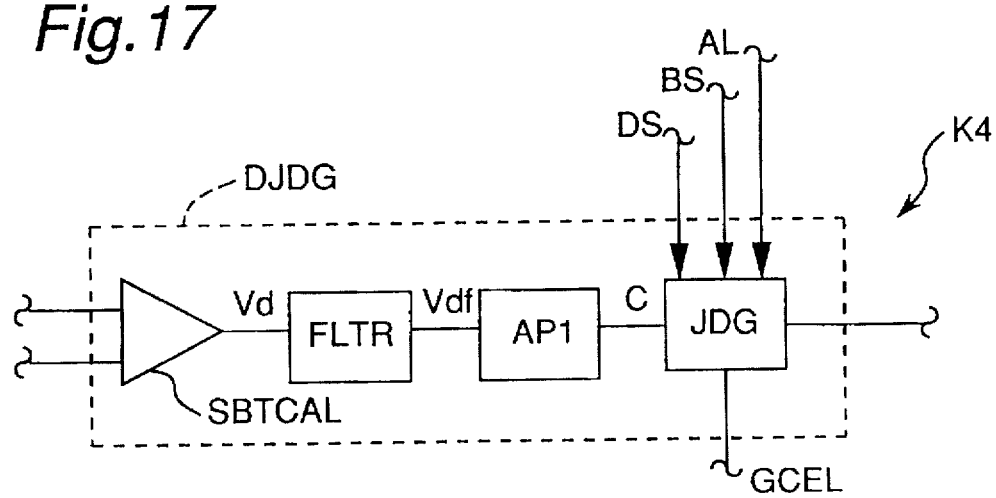
FIG. 17 is a fragmentary schematic view of an antiskid control device according to a fourth embodiment of the present invention.

FIG. 17 shows a drive mode judging means DJDG of an antiskid control device K4 according to a fourth embodiment of the present invention. In the drive mode judging means DJDG of the antiskid control device K4, the smoothed longitudinal speed difference calculating means FLTR similar to that of the antiskid control device K1 is provided between the longitudinal speed difference calculating means SBTCAL and the arithmetic means AP1 of the antiskid control device K2 such that addition and subtraction for the arithmetic value C are performed on the basis of whether the smoothed longitudinal speed difference Vdf is positive or negative.

In the fourth embodiment, since addition and subtraction for the arithmetic value C are performed on the basis of whether the smoothed longitudinal speed difference Vdf is positive or negative as described above, influences of oscillations of the wheel speeds are eliminated further positively and thus, it is possible to judge more accurately that the drive mode of the motor vehicle is 2WD.

Figure 18:
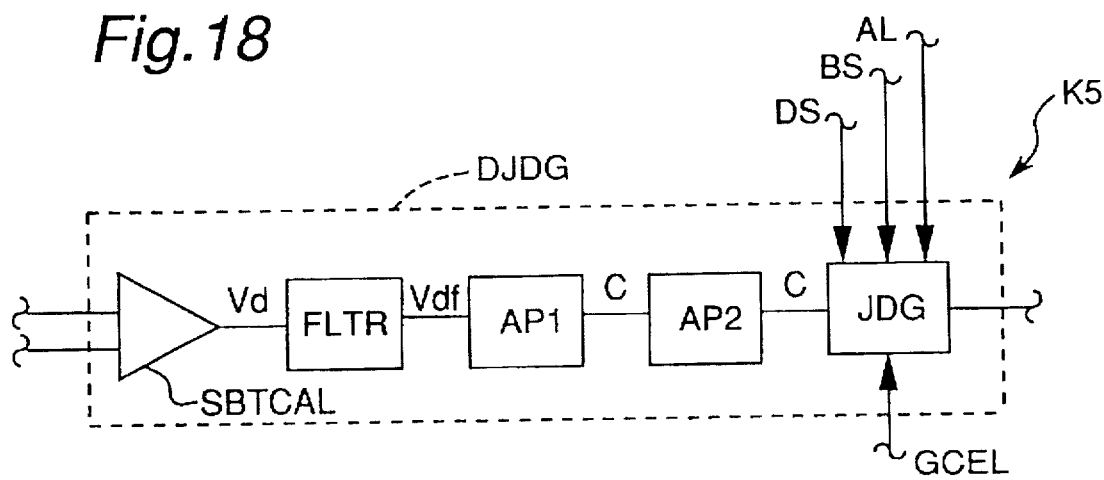
FIG. 18 is a fragmentary schematic view of an antiskid control device according to a fifth embodiment of the present invention.
Figure 19:
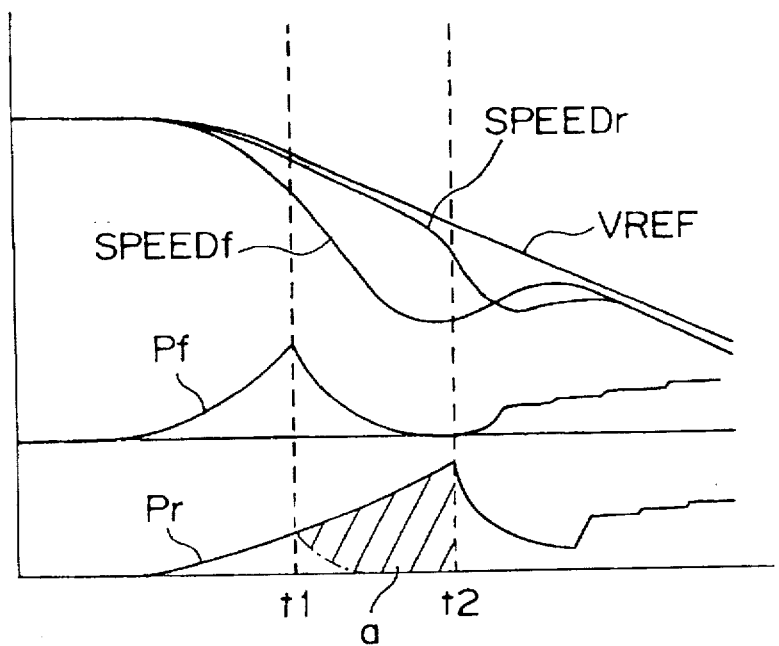
FIG. 19 is a graph showing a drawback in a prior art antiskid control device for part-time 4WD.
Figure 20:
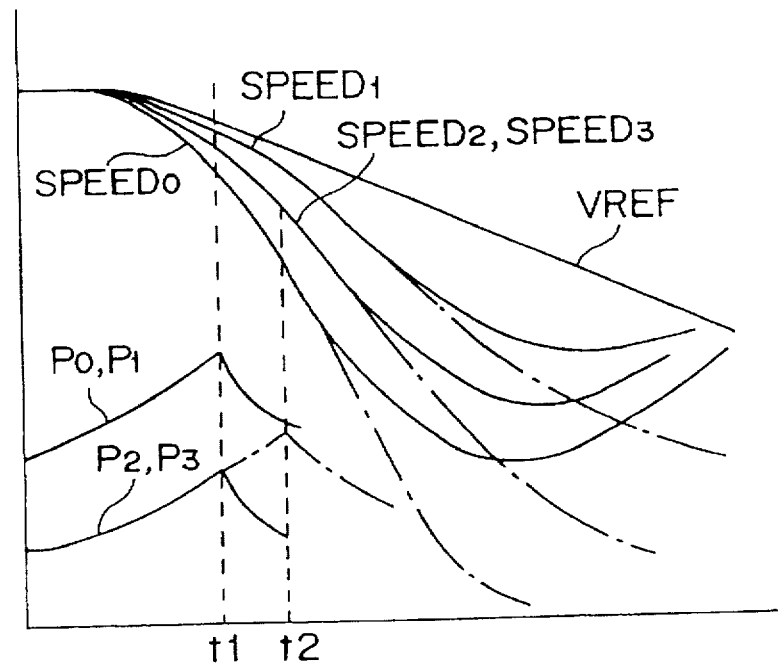
FIG. 20 is a graph showing another drawback in the prior art antiskid control device of FIG. 19.

FIG. 18 shows a drive mode judging means DJDG of an antiskid control device K5 according to a fifth embodiment of the present invention. In the drive mode judging means DJDG of the antiskid control device K5, the smoothed longitudinal speed difference calculating means FLTR is provided between the longitudinal speed difference calculating means SBTCAL and the first arithmetic means AP1 of the antiskid control device K3. Accordingly, also in the fifth embodiment, since addition and subtraction for the arithmetic value C are performed on the basis of whether the smoothed longitudinal speed difference Vdf in the same manner as the fourth embodiment, oscillatory components of the wheel speeds are removed further positively and thus, it is possible to judge more accurately that the drive mode of the motor vehicle is 2WD.

Meanwhile, the present invention is not restricted to the above mentioned embodiments but can be modified variously. For example, in case the drive mode of the motor vehicle is 2WD of the rear wheels, the drive mode judging means DJDG may set absolute values of the upper threshold values $Vth_1$ and $Cth_1$ larger than those of the lower threshold values $Vth_2$ and $Cth_2$. In the case of rear wheel drive, the longitudinal speed difference Vd is inclined to greatly extend into a region of the upper threshold value $Vth_1$ and this state is apt to last for a long time, thereby resulting in addition for the arithmetic value C. Hence, by setting the upper threshold values $Vth_1$ and $Cth_1$ as described above, it is possible to prevent such an erroneous judgement that the drive mode of the motor vehicle is 2WD at the time of 4WD and thus, the drive modes of the motor vehicle can be judged further accurately.

Meanwhile, in the case of 2WD of the front wheels, the drive mode judging means DJDG may set absolute values of the lower threshold values $Vth_2$ and $Cth_2$ larger than those of the upper threshold values $Vth_1$ and $Cth_1$. In the case of front wheel drive, the longitudinal speed difference Vd is inclined to greatly extend into a region of the lower threshold value $Vth_2$ and this state is apt to last for a long time, thus resulting in subtraction for the arithmetic value C. Therefore, by setting the lower threshold values $Vth_2$ and $Cth_2$ as described above, the drive modes of the motor vehicle can be judged further accurately.

Furthermore, when coefficient μ of friction of road surface is high, namely, the vehicle body deceleration GCEL is large in case antiskid control for 4WD is performed, the rear left and right wheels RL and RR may be controlled on the basis of signals from one of the rear left and right wheels RL and RR, which has more manifest locking symptom than the other of the rear left and right wheels RL and RR.

As is clear from the foregoing description, the antiskid control device of claim 1 is an antiskid control device which can be changed over to 2WD and 4WD and includes the drive mode judging means which detects from behaviors of the wheels that the actual drive mode of the motor vehicle is 2WD when the changeover means is set to 4WD. Thus, if this drive mode judging means detects that the actual drive mode of the motor vehicle is 2WD, antiskid control for 2WD is performed. Therefore, also in case malfunctions of the changeover switch, etc. happen, antiskid control for 2WD can be performed positively when the drive mode of the motor vehicle is 2WD. Accordingly, this antiskid control device is capable of preventing extension of braking distance caused when antiskid control for 4WD is performed at the time of 2WD especially on a road surface having low coefficient of friction.

In the antiskid control device of claim 2, the longitudinal speed difference equal to the difference between the average front wheel speed and the average rear wheel speed is smoothed into the smoothed longitudinal speed difference by the smoothed longitudinal speed difference calculating means such that when the smoothed longitudinal speed difference falls out of the range between the predetermined upper threshold value and the predetermined lower threshold value, it is judged that the drive mode of the motor vehicle is 2WD. Therefore, also in case the wheel speeds oscillate, it is possible to positively detect that the actual drive mode of the motor vehicle is 2WD when the changeover means is set to 4WD.

The antiskid control device of claim 3 includes the first arithmetic means for calculating and outputting the arithmetic value subjected to addition and subtraction when the longitudinal speed difference is positive and negative, respectively such that when this arithmetic value falls out of the range between the predetermined upper threshold value and the predetermined lower threshold value, it is judged that the drive mode of the motor vehicle is 2WD. Therefore, also when the wheel speeds oscillate, it is possible to prevent erroneous detection of 2WD.

The antiskid control device of claim 4 includes the first arithmetic means for calculating the arithmetic value subjected to addition and subtraction when the longitudinal speed difference is not less than the predetermined positive upper limit value and is not more than the predetermined negative lower limit value, respectively such that when this arithmetic value falls out of the range between the predetermined upper threshold value and the predetermined lower threshold value, it is judged that the drive mode of the motor vehicle is 2WD. Accordingly, also when the wheel speeds oscillate, it is possible to prevent erroneous detection of 2WD.

The antiskid control device of claim 5 includes the first arithmetic means for calculating the arithmetic value subjected to addition and subtraction when the smoothed longitudinal speed difference is positive and negative, respectively such that when the arithmetic value falls out of the range between the upper threshold value and the lower threshold value, it is judged that the actual drive mode of the motor vehicle is 2WD. Therefore, it is possible to further positively prevent erroneous detection of 2WD due to oscillations of the wheel speeds.

The antiskid control device of claim 6 includes the first arithmetic means for calculating the arithmetic value subjected to addition and subtraction when the smoothed longitudinal speed difference is not less than the predetermined positive upper limit value and not more than the predetermined negative lower limit value, respectively, such that when the arithmetic value falls out of the range between the upper threshold value and the lower threshold value, it is judged that the actual drive mode of the motor vehicle is 2WD. Thus, it is possible to further positively prevent erroneous detection of 2WD due to oscillations of the wheel speeds.

The antiskid control device of claim 7 includes the second arithmetic means which inspects the arithmetic value at an interval of a predetermined number of control cycles so as to perform subtraction and addition for the arithmetic value when the arithmetic value is positive and negative, respectively. Therefore, it is possible to prevent erroneous detection of 2WD due to unnecessary addition or subtraction for the arithmetic value caused by temporary behaviors of the wheels.

In the antiskid control device of claim 8, if the drive mode judging means detects that the drive mode of the motor vehicle is 2WD, antiskid control for 2WD is performed until antiskid control is finished. Accordingly, since antiskid control for 2WD is not changed over to antiskid control for 4WD during antiskid control, it is possible to secure stability of the motor vehicle.

In the antiskid control device of claim 9, absolute values of the upper and lower threshold values are set large during the predetermined period from start of braking of the motor vehicle. Therefore, since influences of oscillations of the wheel speeds at the time of start of braking can be eliminated, it is possible to prevent erroneous detection of 2WD at the time of start of braking.

In the antiskid control device of claim 10, absolute value of the lower threshold value is set larger than that of the upper threshold value in the motor vehicle of front wheel drive at the time of 2WD. In the case of front wheel drive at the time of 2WD, the longitudinal speed difference is inclined to extend into a region of the lower threshold value at the time of 4WD. Thus, by setting the upper and lower threshold values as described above, it is possible to prevent erroneous detection of 2WD further positively.

In the antiskid control device of claim 11, absolute value of the upper threshold value is set larger than that of the lower threshold value in the motor vehicle of rear wheel drive at the time of 2WD. In the case of rear wheel drive at the time of 2WD, since longitudinal speed difference is apt to extend into a region of the upper threshold value at the time of 4WD. Therefore, by setting the upper and lower threshold values as described above, it is possible to prevent erroneous detection of 2WD further positively.

In the antiskid control device of claim 12, only when the vehicle body deceleration detected by the longitudinal acceleration sensor is not more than the preset value, 2WD is detected. Therefore, changeover of antiskid control is performed only for a road surface having low coefficient of friction on which antiskid control for 4WD should be performed during 2WD and such a phenomenon does not take place in which antiskid control for 2WD is performed during 4WD for a road surface having high coefficient of friction so as to increase braking distance.

What is claimed is:

1. An antiskid control device for use in a motor vehicle which can be changed between 2WD and 4WD by a changeover means, comprising:

drive signal output means for outputting a drive signal indicating that the changeover means is set to one of 2WD and 4WD such that changeover between antiskid control for 2WD and antiskid control for 4WD is performed in accordance with the drive signal; and drive mode judging means which detects, based upon behavior of wheels of the motor vehicle, that an actual drive mode of the motor vehicle is 2WD when the drive signal indicates that the changeover means is set to 4WD;

wherein when the drive mode judging means has detected that the actual drive mode of the motor vehicle is 2WD, antiskid control for 4WD is changed to antiskid control for 2WD;

wherein the drive mode judging means includes longitudinal speed difference calculating means for calculating and outputting a longitudinal speed difference equal to a difference between an average front wheel speed and an average rear wheel speed and smooth longitudinal speed difference calculating means for calculating and outputting a smooth longitudinal speed difference obtained by smoothing the longitudinal speed difference, wherein when the smooth longitudinal speed difference falls out of a range between a predetermined upper threshold value and a predetermined lower threshold value when the drive signal indicates that the changeover means is set to 4WD, the drive mode judging means judges that the actual drive mode of the motor vehicle is 2WD.

2. An antiskid control device as claimed in claim 1, wherein during a predetermined period from start of braking of the motor vehicle, the drive mode judging means sets absolute values of the upper threshold value and the lower threshold value large.

3. An antiskid control device as claimed in claim 1, wherein the motor vehicle is of front wheel drive at the time of 2WD and the drive mode judging means sets an absolute value of the lower threshold value larger than an absolute value of the upper threshold value.

4. An antiskid control device as claimed in claim 1, wherein the motor vehicle is of rear wheel drive at the time of 2WD and the drive mode judging means sets an absolute value of the upper threshold value larger than an absolute value of the lower threshold value.

5. The antiskid control device of claim 1, wherein when the drive mode judging means has detected that the actual drive mode of the motor vehicle is 2WD, said drive mode judging means overrides said changeover means to change antiskid control for 4WD to antiskid control for 2WD.

6. The antiskid control device of claim 1, further comprising a longitudinal acceleration sensor for detecting acceleration and deceleration in a longitudinal direction of a vehicle body of the motor vehicle, wherein when the deceleration of the motor vehicle is not more than a preset value, the drive mode judging means judges that the actual drive mode of the motor vehicle is 2WD.

7. An antiskid control device for use in a motor vehicle which can be changed between 2WD and 4WD by a changeover means, comprising:

drive signal output means for outputting a drive signal indicating that the changeover means is set to one of 2WD and 4WD such that changeover between antiskid control for 2WD and antiskid control for 4WD is performed in accordance with the drive signal; and drive mode judging means which detects, based upon behavior of wheels of the motor vehicle, that an actual drive mode of the motor vehicle is 2WD when the drive signal indicates that the changeover means is set to 4WD;

wherein when the drive mode judging means has detected that the actual drive mode of the motor vehicle is 2WD, antiskid control for 4WD is changed over to antiskid control for 2WD;

wherein the drive mode judging means includes longitudinal speed difference calculating means for calculating and outputting a longitudinal speed difference equal to a difference between an average front wheel speed and an average rear wheel speed and arithmetic means for calculating and outputting an arithmetic value subjected to addition and subtraction when the longitudinal speed difference is positive and negative, respectively, wherein when the arithmetic value falls out of a range between a predetermined upper threshold value and a predetermined lower threshold value, the drive mode judging means judges that the actual drive mode of the motor vehicle is 2WD.

8. The antiskid control device of claim 7, wherein when the drive mode judging means has detected that the actual drive mode of the motor vehicle is 2WD, said drive mode judging means overrides said changeover means to change antiskid control for 4WD to antiskid control for 2WD.

9. The antiskid control device of claim 7, further comprising a longitudinal acceleration sensor for detecting acceleration and deceleration in a longitudinal direction of a vehicle body of the motor vehicle, wherein when the deceleration of the motor vehicle is not more than a preset value, the drive mode judging means judges that the actual drive mode of the motor vehicle is 2WD.

10. An antiskid control device for use in a motor vehicle which can be changed between 2WD and 4WD by a changeover means, comprising:

- drive signal output means for outputting a drive signal indicating that the changeover means is said to one of 2WD and 4WD such that changeover between antiskid control for 2WD and antiskid control for 4WD is performed in accordance with the drive signal; and
- drive mode judging means which detects, based upon behavior of wheels of the motor vehicle, that an actual drive mode of the motor vehicle is 2WD when the drive signal indicates that the changeover means is set to 4WD;
- wherein when the drive mode judging means has detected that the actual drive mode of the motor vehicle is 2WD, antiskid control for 4WD is changed over to antiskid control for 2WD;
- wherein the drive mode judging means includes longitudinal speed difference calculating means for calculating and outputting a longitudinal speed difference equal to a difference between an average front wheel speed and an average rear wheel speed and arithmetic means for calculating and outputting an arithmetic value subjected to addition and subtraction when the longitudinal speed difference is not less than a predetermined positive upper limit value and not more than a predetermined negative lower limit value, respectively,
- wherein when the arithmetic value falls out of a range between an upper predetermined threshold value and a lower predetermined threshold value, the drive mode judging means judges that the actual drive mode of the motor vehicle is 2WD.

11. An antiskid control device as claimed in claim 10, wherein the drive mode judging means further includes a second arithmetic means which inspects the arithmetic value at an interval of a predetermined number of control cycles so as to perform a subtraction and an addition for the arithmetic value when the arithmetic value is positive and negative, respectively.

12. The antiskid control device of claim 10, wherein when the drive mode judging means has detected that the actual drive mode of the motor vehicle is 2WD, said drive mode judging means overrides said changeover means to change antiskid control for 4WD to antiskid control for 2WD.

13. The antiskid control device of claim 10, further comprising a longitudinal acceleration sensor for detecting acceleration and deceleration in a longitudinal direction of a vehicle body of the motor vehicle, wherein when the deceleration of the motor vehicle is not more than a preset value, the drive mode judging means judges that the actual drive mode of the motor vehicle is 2WD.

14. An antiskid control device for use in a motor vehicle which can be changed between 2WD and 4WD by a changeover means, comprising:

- drive signal output means for outputting a drive signal indicating that the changeover means is set to one of 2WD and 4WD such that changeover between antiskid control for 2WD and antiskid control for 4WD is performed in accordance with the drive signal; and
- drive mode judging means which detects, based upon behavior of wheels of the motor vehicle, that an actual drive mode of the motor vehicle is 2WD when the drive signal indicates that the changeover means is set to 4WD;
- wherein when the drive mode judging means has detected that the actual drive mode of the motor vehicle is 2WD, antiskid control for a 4WD is changed over to antiskid control for 2WD;
- wherein the drive mode judging means includes longitudinal speed difference calculating means for calculating and outputting a longitudinal speed difference equal to a difference between an average front wheel speed and an average rear wheel speed, smooth longitudinal speed difference calculating means for calculating and outputting a smoothed longitudinal speed difference obtained by smoothing the longitudinal speed difference and arithmetic means for calculating and outputting an arithmetic value subjected to addition and subtraction when the smoothed longitudinal speed difference is positive and negative, respectively,
- wherein when the smoothed longitudinal speed difference falls out of a range between an upper predetermined threshold value and a lower predetermined threshold value when the drive signal indicates that the changeover means is set to 4WD, the drive mode judging means judges that the actual drive mode of the motor vehicle is 2WD.

15. The antiskid control device of claim 14, wherein when the drive mode judging means has detected that the actual drive mode of the motor vehicle is 2WD, said drive mode judging means overrides said changeover means to change antiskid control for 4WD to antiskid control for 2WD.

16. An antiskid control device for use in a motor vehicle which can be changed between 2WD and 4WD by a changeover means, comprising:

- drive signal output means for outputting a drive signal indicating that the changeover means is set to one of 2WD and 4WD such that changeover between antiskid control for 2WD and antiskid control for 4WD is performed in accordance with the drive signal; and
- drive mode judging means which detects, based upon behavior of wheels of the motor vehicle, that an actual drive mode of the motor vehicle is 2WD when the drive signal indicates that the changeover means is set to 4WD;
- wherein when the drive mode judging means has detected that the actual drive mode of the motor vehicle is 2WD, antiskid control for a 4WD is changed to antiskid control for 2WD;
- wherein the drive mode judging means includes longitudinal speed difference calculating means for calculating and outputting a longitudinal speed difference equal to a difference between an average front wheel speed and an average rear wheel speed, smoothed longitudinal speed difference calculating means for calculating and outputting a smoothed longitudinal speed difference obtained by smoothing the longitudinal speed difference and arithmetic means for calculating and outputting an arithmetic value subjected to addition and subtraction when the smoothed longitudinal speed difference is not less than a predetermined positive upper limit value and not more than a predetermined negative lower limit value, respectively, wherein when the arithmetic value falls out of a range between an upper predetermined threshold value and a lower predetermined threshold value, the drive mode judging means judges that the actual drive mode of the motor vehicle is 2WD.

17. An antiskid control device as claimed in claim 16, wherein the drive mode judging means further includes a second arithmetic means which inspects the arithmetic value at an interval of a predetermined number of control cycles so as to perform a subtraction and an addition for the arithmetic value when the arithmetic value is positive and negative, respectively.

18. An antiskid control device for use in a motor vehicle which can be changed over to 2WD and 4WD by a changeover means, comprising:

drive signal output means for outputting a drive signal indicating that the changeover means is set to one of 2WD and 4WD such that changeover between antiskid control for 2WD and antiskid control for 4WD is performed in accordance with the drive signal;

drive mode judging means which detects, based upon behavior of wheels of the motor vehicle, that an actual drive mode of the motor vehicle is 2WD when the drive signal indicates that the changeover means is set to 4WD; and a longitudinal acceleration sensor for detecting acceleration and deceleration in a longitudinal direction of a vehicle body of the motor vehicle;

wherein when the drive mode judging means has detected that the actual drive mode of the motor vehicle is 2WD, antiskid control for a 4WD is changed to antiskid control for 2WD;

wherein when the deceleration of the motor vehicle is not more than a preset value, the drive mode judging means judges that the actual drive mode of the motor vehicle is 2WD.

\* \* \* \* \*

UNITED STATES PATENT AND TRADEMARK OFFICE
CERTIFICATE OF CORRECTION

PATENT NO. : 5,740,042
DATED : April 14, 1998
INVENTOR(S) : H. FUJIOKA

It is certified that error appears in the above-identified patent and that said Letters Patent is hereby corrected as shown below:

On the cover page of the printed patent, paragraph [54] Title of the Invention, line 2, change "MADE" to ---MODE---.

Column 1, line 2, change "MADE" to read --MODE--.

Signed and Sealed this

Twenty-second Day of September, 1998

Attest:

BRUCE LEHMAN

*Attesting Officer*       *Commissioner of Patents and Trademarks*